US012674756B2

(12) United States Patent

Simpson et al.

(10) Patent No.: US 12,674,756 B2

(45) Date of Patent: Jul. 7, 2026

(54) METHOD AND APPARATUS FOR DETECTING ALPHA PARTICLES IN A SAMPLE CONTAINING SAMPLE MEDIA AND WATER

(71) Applicant: ATOMIC ENERGY OF CANADA LIMITED/ÉNERGIE ATOMIQUE DU CANADA LIMITÉE, Chalk River (CA)

(72) Inventors: Nicholas Simpson, Chalk River (CA); Emily Li, Chalk River (CA); Tim Harris, Chalk River (CA); Daniel Cadieux, Chalk River (CA); Shuwei Yue, Chalk River (CA); Guy Leblond, Chalk River (CA); Liqian Li, Chalk River (CA); Ghaouti Bentoumi, Chalk River (CA); Stephen Cudmore, Chalk River (CA)

(73) Assignee: ATOMIC ENERGY OF CANADA LIMITED/ÉNERGIE ATOMIQUE DU CANADA LIMITÉE

( * ) Notice: Subject to any disclaimer, the term of this patent is extended or adjusted under 35 U.S.C. 154(b) by 573 days.

(21) Appl. No.: 17/801,373

(22) PCT Filed: Feb. 25, 2021

(86) PCT No.: PCT/CA2021/050235

§ 371 (c)(1),
(2) Date: Aug. 22, 2022

(87) PCT Pub. No.: WO2021/168576

PCT Pub. Date: Sep. 2, 2021

(65) Prior Publication Data

US 2023/0349827 A1      Nov. 2, 2023

Related U.S. Application Data

(60) Provisional application No. 62/983,262, filed on Feb. 28, 2020.

(51) Int. Cl.
*G01N 21/64* (2006.01)

(52) U.S. Cl.
CPC ................................... *G01N 21/64* (2013.01)

(58) Field of Classification Search
CPC .................................................... G01N 21/64
See application file for complete search history.

(56) References Cited

U.S. PATENT DOCUMENTS

| | | | |
|---|---|---|---|
| 5,184,019 A | 2/1993 | Macarthur et al. | |
| 5,442,180 A | 8/1995 | Perkins et al. | |

(Continued)

FOREIGN PATENT DOCUMENTS

| | | |
|---|---|---|
| CN | 107664765 A | 2/2018 |
| JP | 6343785 B2 | 6/2018 |

(Continued)

OTHER PUBLICATIONS

Written Opinion in PCT/CA2021/050235, issued Aug. 30, 2022.

(Continued)

*Primary Examiner* — Carolyn Fin
(74) *Attorney, Agent, or Firm* — Joseph C. Zucchero; Carolyn S. Elmore; Elmore Patent Law Group, P.C.

(57) ABSTRACT

A method of detecting alpha particles may include providing a layer of a scintillating slurry comprising a granular scintillating material in water onto a measurement surface of a sample; positioning the sample having the scintillating slurry within a detection chamber of detection apparatus; detecting photons produced by the granular scintillating material in the scintillating slurry when the granular scintillating material is excited by ionizing alpha radiation emitted by alpha particles within the sample using a photon detector and generating a corresponding output signal; and removing the sample and the scintillating slurry from the detection chamber.

15 Claims, 20 Drawing Sheets

(56)                  References Cited

U.S. PATENT DOCUMENTS

| | | | |
|---|---|---|---|
| 5,525,804 A | 6/1996 | Macarthur et al. | |
| 8,735,830 B1 * | 5/2014 | Nagarkar | G01T 1/202 |
| | | | 250/362 |
| 9,666,412 B1 * | 5/2017 | Litman | H01J 37/28 |
| 2015/0276939 A1 * | 10/2015 | Chappo | G01T 1/161 |
| | | | 250/361 R |
| 2016/0103230 A1 | 4/2016 | Clark | |
| 2020/0326432 A1 * | 10/2020 | Donnard | G01T 1/365 |

FOREIGN PATENT DOCUMENTS

| | | |
|---|---|---|
| JP | 2018132392 B2 | 6/2018 |
| KR | 101419766 B1 | 7/2014 |
| RU | 2059264 C1 | 4/1996 |

OTHER PUBLICATIONS

Foster, J., "A comparison of the ZnS(Ag) scintillation detector to the silicon semiconductor detector for quantification of alpha radioactivity in aqueous solutions", All Theses. 10. https://tigerprints.clemson.edu/all_theses/10, Dec. 2006.

Kerst, T. et al., "Alpha radiation-induced luminescence by Am-241 in aqueous nitric acid solution", Sensors, 19(7), https://doi.org/10.3390/s19071602, Jan. 2019, 1602.

Knoll, G. F., "Radiation Detection and Measurement", Third Edition, John Wiley & Sons, Inc; NY, 2000, 816 pgs.

Maire, D. et al., "New liquid scintillation counter development using Silicon Photomultipliers", 2018 IEEE Nuclear Science Symposium and Medical Imaging Conference Proceedings (NSS/MIC), Nov. 10, 2018, pp. 1-2.

Extended European Search Report for EP21761040.1, mailed Feb. 2, 2024.

Ando, K. , "Development of an optical lens based alpha-particle imaging system using position sensitive photomultiplier tube", Nuclear Instruments and Methods in Physics Res. A, 844, https://doi.org/10.1016/j.nima.2016.11.037, 2017, 72-76.

DP5G product user manuel, produced by Amptek Inc., available online at https://www.amptek.com/-/media/ametekamptek/documents/resources/products/user-manuals/dp5g-user-manual-b2.pdf?la=en&revision=6a8c48d8-fc45-4528-9137-c489fc280108.

* cited by examiner

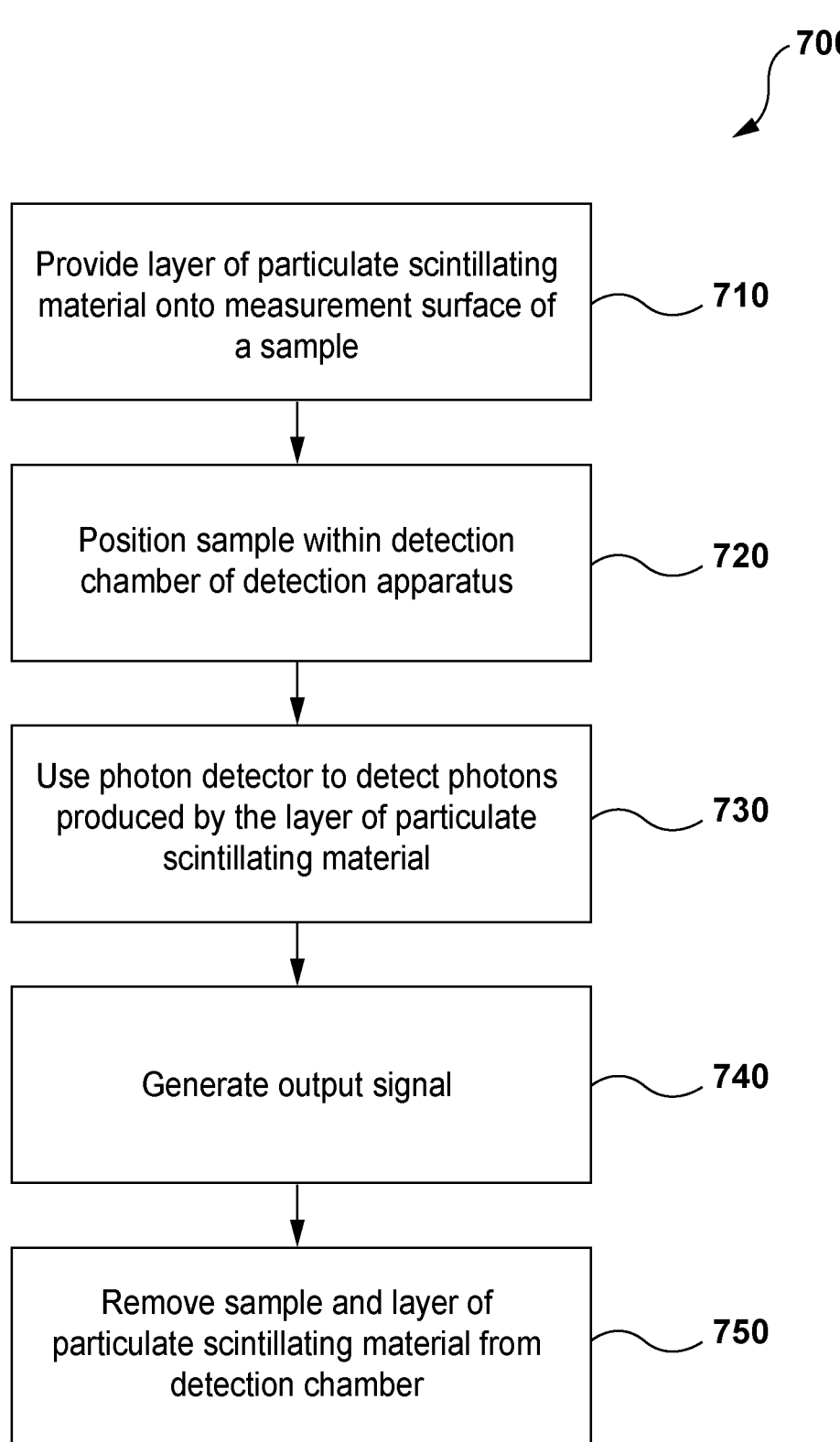

700

Provide layer of particulate scintillating material onto measurement surface of a sample — 710

Position sample within detection chamber of detection apparatus — 720

Use photon detector to detect photons produced by the layer of particulate scintillating material — 730

Generate output signal — 740

Remove sample and layer of particulate scintillating material from detection chamber — 750

FIG. 7

METHOD AND APPARATUS FOR DETECTING ALPHA PARTICLES IN A SAMPLE CONTAINING SAMPLE MEDIA AND WATER

CROSS-REFERENCE TO RELATED APPLICATION

This application claims the benefit of U.S. provisional application No. 62/983,262, filed Feb. 28, 2020 and entitled Method And Apparatus For Detecting Alpha Particles In A Sample Containing Soil And Water, the entirety of which is incorporated herein by reference.

FIELD

In one of its aspects, the present disclosure relates generally to a method and apparatus for detecting the presence of alpha particles in a sample containing a sample media (such as soil, sand, granulated wood, grass, an alpha contaminated liquid and the like) and water, and more particularly, to a portable alpha particle detection apparatus that can be used to analyze a sample outside of a conventional laboratory environment.

INTRODUCTION

U.S. Pat. No. 5,525,804 discloses a background canceling long range alpha detector which is capable of providing output proportional to both the alpha radiation emitted from a surface and to radioactive gas emanating from the surface. The detector operates by using an electrical field between first and second signal planes, an enclosure and the surface or substance to be monitored for alpha radiation. The first and second signal planes are maintained at the same voltage with respect to the electrically conductive enclosure, reducing leakage currents. In the presence of alpha radiation and radioactive gas decay, the signal from the first signal plane is proportional to both the surface alpha radiation and to the airborne radioactive gas, while the signal from the second signal plane is proportional only to the airborne radioactive gas. The difference between these two signals is proportional to the surface alpha radiation alone U.S. Pat. No. 5,442,180 discloses an apparatus for determining the concentration of radioactive constituents in a test sample; such as surface soils, via rapid real-time analyses, and direct readout on location utilizing a probe made up of multiple layers of detection material used in combination with an analyzer and real-time readout unit. This is accomplished by comparing the signal received from the probe, which can discriminate between types of radiation and energies with stored patterns that are based upon experimental results. This comparison can be used in the calibration of a readout display that reads out in real-time the concentrations of constituents per given volume. For example, the concentration of constituents such as Cs-137, Sr-90, U-238 in the soil, and noble gas radionuclides such as Kr-85 in the atmosphere, can be measured in real-time, on location, without the need for laboratory analysis of samples.

U.S. Pat. No. 5,184,019 discloses a matrix of light-sensitive or x-ray sensitive sensors ($S_1$, 1, ... $S_{2000}$, 200) are arranged in rows and columns and generate charges in dependence on the amount of incident radiation. The sensors comprise a respective electric switch (3) and are constructed, like the electric switches (3), of thin-film technology. Each sensor row has a switching line (5, 6, ... , 7) via which the switches can be activated so that the charges of the relevant activated sensor row are simultaneously output via read lines (8, 9, ... , 10, ... ). Transfer means convert the signals read in parallel into a serial output signal; in order to achieve an as favorable as possible noise behavior. An amplifier (11, 12, ... , 13) is in each read line and is constructed as a silicon crystal and precedes the transfer means. During the read operations, the amplifiers simplify the signals read from the sensors ($S_1$, 1, ... $S_{2000}$, 2000) connected to the relevant read line (8, 9, ... , 10, ... ).

Japanese patent publication 2018132392 discloses a soil radioactive contamination test apparatus having a radiation detector having a scintillator, an amplifier circuit for amplifying an electric pulse signal outputted by from the radiation detector, a measurement pulse wave height distribution A multichannel analyzer for extracting the measurement result from the multichannel analyzer and a response function stored in the response function memory for the measured pulse height distribution extracted by the multichannel analyzer, An energy spectrum of the radioactive material deposited on the soil, and an energy spectrum of the radioactive material deposited on the soil, based on the energy spectrum extracted by the inverse problem calculation unit and the radiation source depth distribution stored in the buffer depth distribution memory and a depth distribution calculating unit for obtaining a radioactivity concentration.

SUMMARY

In accordance with one broad aspects of the teachings described herein, a method of detecting alpha particles in a sample comprising a sample media and water using a portable detection apparatus may include the steps of:
  a) providing a layer of a scintillating slurry comprising a granular scintillating material in water onto a measurement surface of the sample;
  b) positioning the sample having the scintillating slurry within a detection chamber of detection apparatus;
  c) detecting photons produced by the granular scintillating material in the scintillating slurry when the granular scintillating material is excited by ionizing alpha radiation emitted by alpha particles within the sample using a photon detector and generating a corresponding output signal;
  d) removing the sample and the scintillating slurry from the detection chamber.

The method may include disposing of the sample and the scintillating slurry after step d).

The scintillating slurry may cover substantially the entire measurement surface of the sample.

The measurement surface may be non-uniform.

The alpha particles in the sample may be present in the sample media in the sample and the water in the sample is substantially free of alpha particles.

The scintillating slurry may be formed prior to step a) by mixing the granular scintillating material with water and the pre-mixed scintillating slurry may be applied to the measurement surface in step a).

The scintillating slurry may be formed during step a) by depositing a dry powder comprising the granular scintillating material onto the measurement surface. The dry powder comprising the granular scintillating material may be mixed with at least one of the water present in the sample and a quantity of water applied to the measurement surface thereby forming the scintillating slurry in situ on the measurement surface.

The method may include depositing the dry powder comprising the granular scintillating material onto the measurement surface and then applying a mist of water onto the measurement surface thereby forming the scintillating slurry in situ on the measurement surface.

The method may include applying a mist of water onto the measurement surface and then depositing the dry powder comprising the granular scintillating material onto the measurement surface, thereby forming the scintillating slurry in situ on the measurement surface.

The scintillating slurry used in step a) may include at least 1% granular scintillating material by weight.

The scintillating slurry used in step a) may have a slurry thickness of between about 3 µm and about 20 µm.

The sample media may have a sample thickness measured in the first direction that is between about 3 mm and 20 mm.

The measurement surface may have a surface area of between about 2 cm$^2$ and about 100 cm$^2$ and the sample has a thickness in the thickness direction that is between 0.5 cm and about 2 cm.

The granular scintillating material may have a density of between about 3.5 and about 4.5 g/cm$^3$.

The granular scintillating material may include a plurality of particles having a typical particle size of about 8 µm.

The method may include transporting the detection apparatus to a testing location and obtaining the sample from the ground at the testing location prior to performing step a).

The method may include depositing the sample in a sample holder prior to step a), wherein the sample holder may be insertable into the detection chamber in step b) and removable from the detection chamber in step d).

The detection chamber may be configurable in an open configuration in which the sample and layer of scintillating slurry is insertable or removable from the detection chamber and a closed configuration in which external ambient light is excluded from the detection chamber.

Step c) may be performed for a detection period that is between about 2 and 25 minutes.

The scintillating slurry may have a detection efficiency of at least 10% and preferably at least about 15%.

The granular scintillating material may include a silver-activated zinc sulphide (ZnS[Ag]).

The method may include comparing the output signal to a predetermined output threshold value and displaying a user output on a user display device if the output signal exceeds the output threshold value.

The method may include amplifying the output signal prior to comparing the output signal to the predetermined output threshold value.

The user display device may include at least one of a display screen, an audio transducer, a light source, a haptic feedback device and a combination thereof.

The method may include detecting alpha particles in a second sample comprising sample media and water using the portable detection apparatus with the additional steps of:

e) after completing step d), providing a second layer of the scintillating slurry comprising the granular scintillating material in water onto a measurement surface of the second sample;

f) positioning the second sample having the second layer of the scintillating slurry within the detection chamber of detection apparatus;

g) detecting photons produced by the granular scintillating material in the second layer of the scintillating slurry when the granular scintillating material is excited by ionizing alpha radiation emitted by alpha particles within the second sample using a photon detector and generating a corresponding second output signal;

h) removing the second sample and the second layer of the scintillating slurry from the detection chamber.

In accordance with another broad aspect of the teachings described herein, a portable detection apparatus for detecting alpha particles in a sample comprising sample media and water and having a measurement surface may include a detection chamber that is in configurable in an open configuration, to removably receive a first sample comprising sample media and water and having a measurement surface and a layer of scintillating slurry covering at least a portion of the measurement surface, and a closed configuration in which the sample and layer of scintillating slurry are contained within an interior of the detection chamber and external ambient light is excluded from the interior. A photon detector may be positioned opposite the measurement surface when the detection chamber is closed and configured to detect photons produced by a granular scintillating material in the first scintillating slurry when the granular scintillating material is excited by ionizing alpha radiation emitted by alpha particles within the first sample and to generate a corresponding first output signal during a first detection period. The first sample and first layer of scintillating slurry may be removable from the detection chamber after the first detection period.

A controller may be communicably linked to the photon detector to receive the first output signal and may be configured to generate a first display signal based on the first output signal.

A user display device may be communicably linked to the controller and may be configured to display a first user output based on the first output signal.

A first wall of the detection chamber may be substantially optically transparent and may be disposed between the sample and the layer of scintillating slurry and the photon detector when the detection chamber is closed.

The photon detector may include a photomultiplier tube and/or a silicon photomultiplier.

A sample holder may be configured to contain the sample and may be removably positionable within the detection chamber with the sample.

The sample holder may be substantially liquid impermeable.

The scintillating slurry may cover substantially the entire measurement surface of the sample.

The measurement surface may be non-uniform (i.e. rough—macro surface texture due to sample media).

The alpha particles in the sample may be present in the sample media in the sample and the water in the sample may be substantially free of alpha particles.

The scintillating slurry may include at least 1% granular scintillating material by weight.

The scintillating slurry may have a slurry thickness of between about 3 µm and about 20 µm.

The sample media may have a sample thickness measured in the first direction that is between about 3 mm and 20 mm.

The measurement surface may have a surface area of between about 2 cm$^2$ and about 110 cm$^2$ and the sample may have a thickness in the thickness direction that is between 0.5 cm and about 2 cm.

The granular scintillating material may have a density of between about 3.5 and 4.5 g/cm$^3$.

The granular scintillating material may include a plurality of particles having a typical particle size of about 8 µm.

The scintillating slurry may have a detection efficiency of at least 10% and preferably at least about 15%.

The controller may be configured to compare the output signal to a predetermined output threshold value and display the first user output if the output signal exceeds the output threshold value.

The user display device may include at least one of a display screen, an audio transducer, a light source, a haptic feedback device and a combination thereof.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIG. 7 is one example of a method detecting alpha particles in a sample comprising soil (one example of a sample media) and water using a portable detection apparatus;

DETAILED DESCRIPTION

Figure 1:
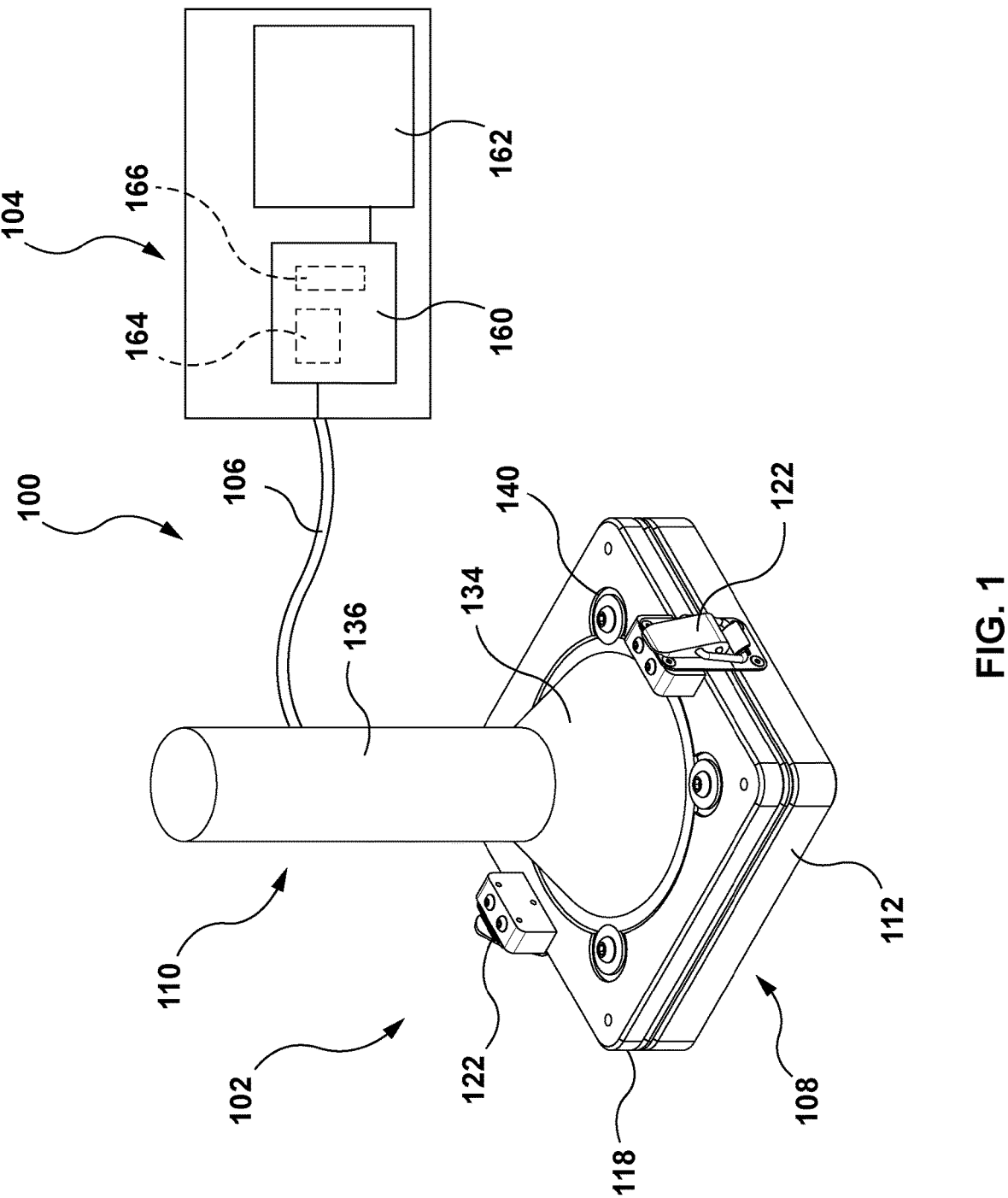
FIG. 1 is a perspective view of one example of a portable detection apparatus.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Under some circumstances a sample media, such as soil, sand, granulated wood, grass, an alpha contaminated liquid and the like may be contaminated with radioactive material and may contain materials that emit alpha particle radiation, which can be referred to as alpha sources. As used herein, the term soil can be understood to generally mean the ground or earth, such as would be present in an undeveloped location or site. The soil as referred to in this disclosure may contain dirt, sand, rocks, organic matter/debris, minerals and other such constituent components. In addition to the solid soil material, water and other liquids may also be present in the ground/soil at a given location. The water may include ground water, surface water (such as lakes, rivers and the like) rain water, dew and water from other natural or manmade sources. Other materials such as wood, grass, sand etc. . . . that has been smashed or otherwise transformed to resemble the physical properties of wet soil and can be considered wet media or a wet sample media for the purposes of this description. Other examples of wet sample media may be an alpha contaminated liquid, to the extent that it can transmit light within a reasonable distance (e.g. a few millimeters). To complete the analysis on an alpha contaminated liquid a scintillation power can be suspended or sprayed into the liquid, in accordance with the methods and processes described herein. While testing on soil is described in more detail herein as one example of the present teachings, the inventors have determined based on test data that the exemplary values contained in this specification for slurry thickness, sample thickness, surface area and other physical properties are materially the same for other types of wet, sample media as those described in relation to the soil samples.

In some circumstances, it may be desirable for a technician to check for the presence of radioactive contamination in the field, or in situ, at a target location from where a sample is to be obtained and tested. This type of on site or in field testing is generally an alternative to an off-site or laboratory based testing procedure in which a sample is obtained from the target location and then transported away from the target location to a fixed testing facility or laboratory. On site testing can require the use of a portable detection apparatus that can be physically transported to or at least near to the target sampling location, whereas equipment utilized in off-site based testing procedures need not be portable in the same way, and may be larger, more delicate, have relatively higher resource requirements or the like. Portable testing equipment may also, in some examples, be more robust than lab-based equipment and optionally may be operable to provide triage or preliminary-detection type feedback to a user based on samples and/or test conditions that are not as refined or controlled as those that would be expected in a laboratory. Testing on site may help reduce or eliminate the need to transport potentially radioactive samples from the target sample site to a lab facility. It may also provide at least partially complete test results in a relatively shorter time period, as travel time need not be considered. This may help provide early indications of radioactive contamination faster than would be achieved using off-site testing practices.

Currently, if attempting to detect radioactive contamination in the ground at a target location operators working at the target location can obtain a sample containing soil and use an existing alpha counter to scan the soil to determine the level of contamination, such as a Ludlums Model #43-5 Alpha_probe and Model #3 meter. Such existing technology typically uses a reusable scintillator (typically a solid or crystalline construction) that is attached to a suitable detector head. When the instrument is used to survey the contaminated soil sample a measurement surface of the sample is positioned proximate the scintillator and the alpha particles present in the sample can penetrate the air gap between the soil and the detector head and hit the scintillator. The photons generated by exciting the scintillator with ionizing alpha particle radiation can then be converted to electrical pulses, and a readout system can amplify the pulses and count the rate of the pulses to determine the activity of the contaminated soil.

However, while current detectors can obtain generally satisfactory results when analyzing soil that is relatively dry (e.g. such that the measurement surface is not covered or obscured by a layer or film of water) they do not provide reliable readings/measurements if the soil is relatively wet (e.g. if a layer of film of water covers at least a portion of a desired measurement surface). For example, if the sample contains both soil and enough water so as to be considered wet and/or has a layer or film of water covering a designated measurement surface on the sample (i.e. the location from which a measurement is to be taken), then the alpha particles tend to be substantially attenuated by the water film to a degree that they are not reliably detected using conventional detectors. This can mask the presence of radioactive contamination and/or may require that wet samples be dried or otherwise processed to remove water before being suitable for testing. This can sometimes require the use of additional equipment (a drying apparatus, etc.) and may prolong the time it takes to obtain a reliable measurement from the sample. For example, if it has rained, or the soil is wet from dew, the current field detection techniques may not provide reliable measurement results, or any results, since the alpha counter cannot detect the radiation that is being blocked by the water. The granular sample media samples contemplated herein are understood to be generally, solid samples (such as a soil sample) that contain some degree of water—such as an amount sufficient to form a layer or film—but that remain generally solid when being tested, as contrasted against a mud sample or slurry or liquid sample that are substantially a dirty or soil-contaminated liquid (flow like liquid).

In accordance with one broad aspect of the teachings described herein, a new method of detecting alpha particles in sample that contains both soil and water (i.e. a wet soil sample) has been developed. In accordance with one broad aspect of the teachings described herein, that may be used alone or in combination with other disclosed aspects, a portable detection apparatus that can be used to detect alpha particles in a wet soil sample is disclosed. Instead of utilizing a conventional, re-usable scintillator that is placed adjacent the measurement surface on the sample, the present apparatus can instead utilize a layer of a scintillating slurry that is applied to and covers, and preferably is in direct physical contact with, at least a portion of the measurement surface. The scintillating slurry can include a plurality of discrete particles that have been deposited onto the measurement surface in the presence of a layer of water that is covering the measurement surface, preferably in a substantially uniform layer. The particles in the layer of particulate scintillating material may be generally denser than water and if deposited on the layer of water covering the measurement surface the particles of scintillating material will tend to sink through the layer of water and collect/settle on the measurement surface. Freely dispersing the particulate scintillating material in this manner can allow the layer of particulate scintillating material to be formed on rest, and preferably substantially conform to the surface topography of, the measurement surface even in the presence of the layer of water. Once deposited on the surface, the layer of particulate scintillating material may be at least partially, and optionally entirely, submerged within the layer of water that covers the measurement surface. Alternatively, the scintillating slurry may be pre-mixed and applied to the surface in its slurry form. The scintillating slurry is preferably a solution of a granular, scintillating material that has been mixed with a liquid, which optionally may be aqueous and preferably may be water.

When excited by ionizing alpha radiation emitted by alpha particles within the first sample (in any), the particulate scintillating material in the layer of particulate scintillating material may produce photons which then exit the layer of particulate scintillating material. The photons can also escape the layer of water that the particulate scintillating material is immersed in and traverse an air gap and/or pass thorough other walls/material if needed to reach a detector. The escaping photons can then be detected/measured using a suitable photon detector and converted into suitable output signals (preferably electrical signals). The output signals can then be processed by a suitable controller (including a computer, PLC, multiple channel analyzer, oscilloscope and the like), optionally including an amplification or pre-amplification step, to optionally produce one or more desired display signals. The display signals may optionally be delivered to a suitable user display device that can generate a display for a user/operator to observe.

The user display device may include any suitable type of hardware and/or software, and may include, for example, a display screen, a print-out, a light or other visual indicator, a sound or other auditory indicator, vibration and/or haptic feedback and the like. For example, an indicator light may be illuminated if alpha particles are present and remain non-illuminated if not. Optionally, the processing may also include a quantification (coarse or fine) of the amount of alpha radiation detected (and the associated amount of alpha emitting material within the sample) and values, graphs, graphical indicia or other such representative displays may be provided to a user on a display screen (such as a computer monitor, screen on an oscilloscope, a mobile device screen and the like).

In some preferred embodiments of the method and apparatuses described herein, a user may directly apply scintillating slurry (including a quantity of a dry scintillation powder (i.e. a granular form of a scintillating material) mixed with water) on top of the measurement surface of the wet soil sample. In this arrangement, the slurry is in direct liquid communication with the soil sample and there is substantially no air gap between the measurement surface and the scintillating material that is used. Mixing the scintillating material within a liquid, and preferably an aqueous liquid like water, has been found to help facilitate the alpha particles' penetration of the water film and reach the scintillation powder. Photons generated by the scintillating material within the slurry can then escape the liquid layer and cross an air gap between the slurry and a suitable photon detector apparatus. These photons be measured using read-out system, and optionally amplified, to determine the contamination.

In this arrangement, the potable detection apparatus need not include a fixed/permanent scintillator. Instead, the detection chamber (into which the sample is placed) may not include any type of scintillating material when empty (i.e. be free or at least substantially free of scintillating material without a sample present). The layer of particulate scintillating material can then be added to the sample, and the combined sample and layer of particulate scintillating material can be placed into the detection chamber for analysis, thereby providing the scintillating material that will be used in the detecting/measuring process. Alternatively, the sample material may be provided in the detection chamber and then the particulate scintillating material can be dispersed on top. When the measurement is complete, all or at least substantially all of the scintillating material may then be removed from the detection chamber along with the sample.

Optionally, the scintillating slurry may be considered to be a generally single-use scintillator. While the granular scintillating material itself may be relatively robust and may not be materially degraded by exposure to the alpha radiation, the intimate contact and/or mixing of the scintillating slurry with the sample being tested may make it difficult to separate the scintillating slurry from the sample after the testing is complete. Accordingly, in some embodiments of the apparatus and methods described herein the scintillating slurry may be removed from the testing apparatus with the sample and may optionally be discarded or otherwise disposed of. If a second sample is to be tested it can be provided with a new portion/batch of the scintillating slurry. A portable testing system may then optionally be configured to include a testing apparatus/device as well as a sufficient supply of granular scintillating material and/or pre-mixed scintillating slurry to provide multiple doses/applications of a slurry on different samples to be tested.

The granular scintillating material used to form the slurry may be any suitable material that is responsive to alpha radiation and has a desired and/or acceptable level of scintillation efficiency (such as at least 70%, 72%, 74% or more). Optionally, granular scintillating material used to form the scintillating slurry may have a detection efficiency of at least about 10%, and preferably above 15%.

The physical properties of the granular scintillating material used to form the slurry may also be selected based on a preferred particle size, density and other relevant mechanical properties. Optionally, the granular scintillating material may have a density of between about 3.5 and about 4.5 g/cm$^3$. Optionally, the granular scintillating material may include a plurality of particles having a typical particle size of between about 3 μm and about 20 μm, or other suitable sizes.

For example, a granular form of a silver-activated zinc sulphide (ZnS[Ag]) scintillator has been used in some of the experiments described herein, in part for its sufficiently high scintillation efficiency. Other scintillating materials, such as yttrium aluminum perovskite crystal doped with cerium (YAP[Ce]), could be potentially used as well.

As described in more detail herein, the scintillating slurry may be prepared in any suitable manner, including the creation of a suitable slurry by i) combining the granular scintillating material with an appropriate amount of water or other liquid and then applying the pre-mixed slurry onto the measurement surface, or ii) depositing dry, granular scintillating material onto a measurement surface that is wet with liquid contained in the sample itself and forming the slurry in situ on the measurement surface by combining the granular scintillating material with the existing liquid/water (either passively and/or assisted by mixing, shaking or the like), or iii) other possible methods.

It is believed that utilizing a slurry of this nature may facilitate the alpha particles penetrating the relatively short distance, and lack of air gap, between the sample soil and the scintillating material in the slurry while the photons emitted by the scintillating material may then face less resistance/obstruction and/or attenuation as they exit the slurry and travel to the photon detector (possibly across an air gap).

Referring to FIGS. 1-5, one example of a portable detection apparatus 100 for detecting alpha particles in a sample comprising soil and water. In this example, the portable detection apparatus 100 includes a detector unit 102 and a control unit 104. The detector unit 102 and control unit 104 may be integrally formed with each other, or as shown in this example may be physically separable from each other and linked by any suitable communication and/or power link, such as wire 106.

Figure 2:
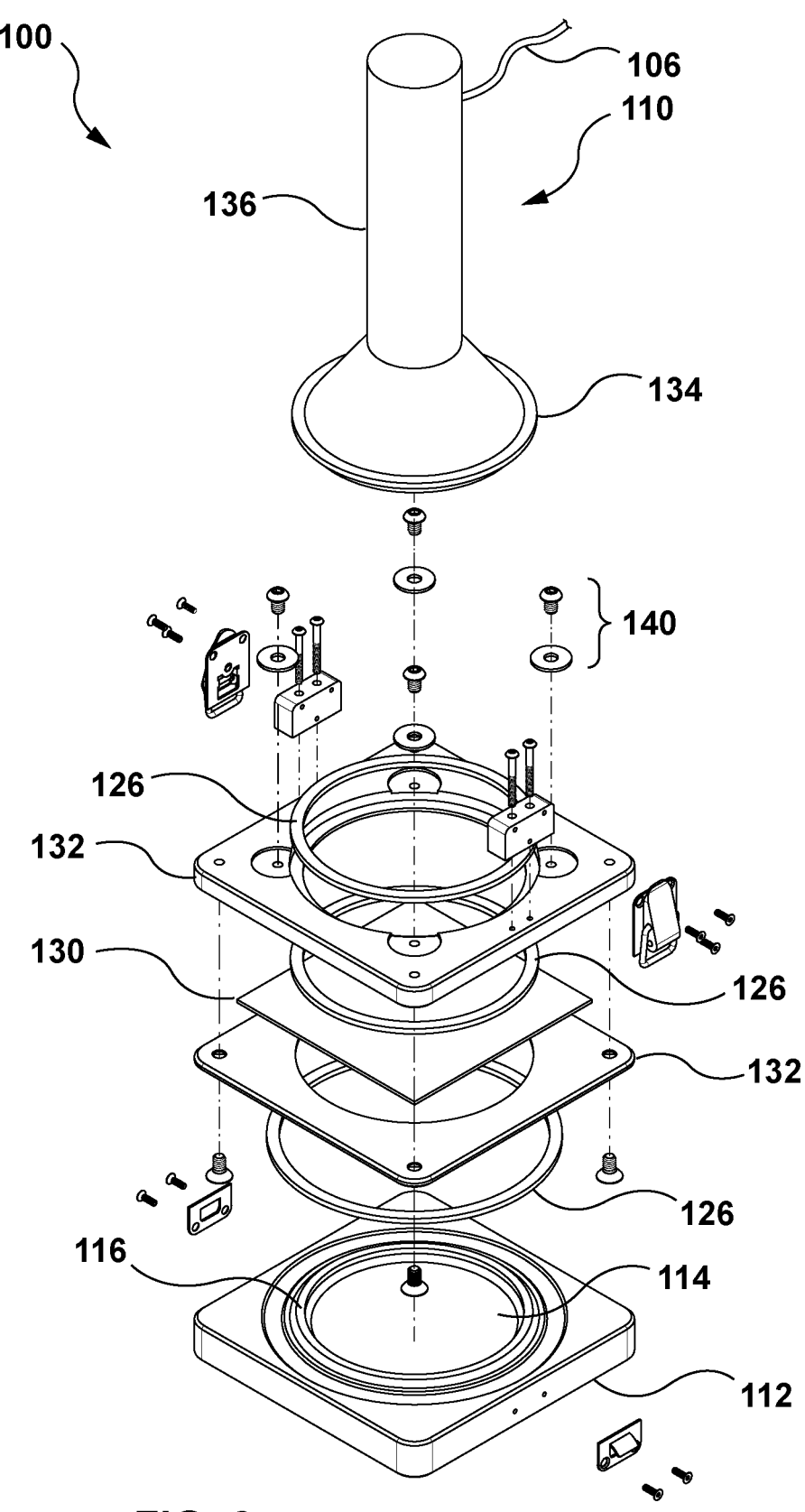
FIG. 2 is a partially exploded view of the portable detection apparatus of FIG. 1.
Figure 3:
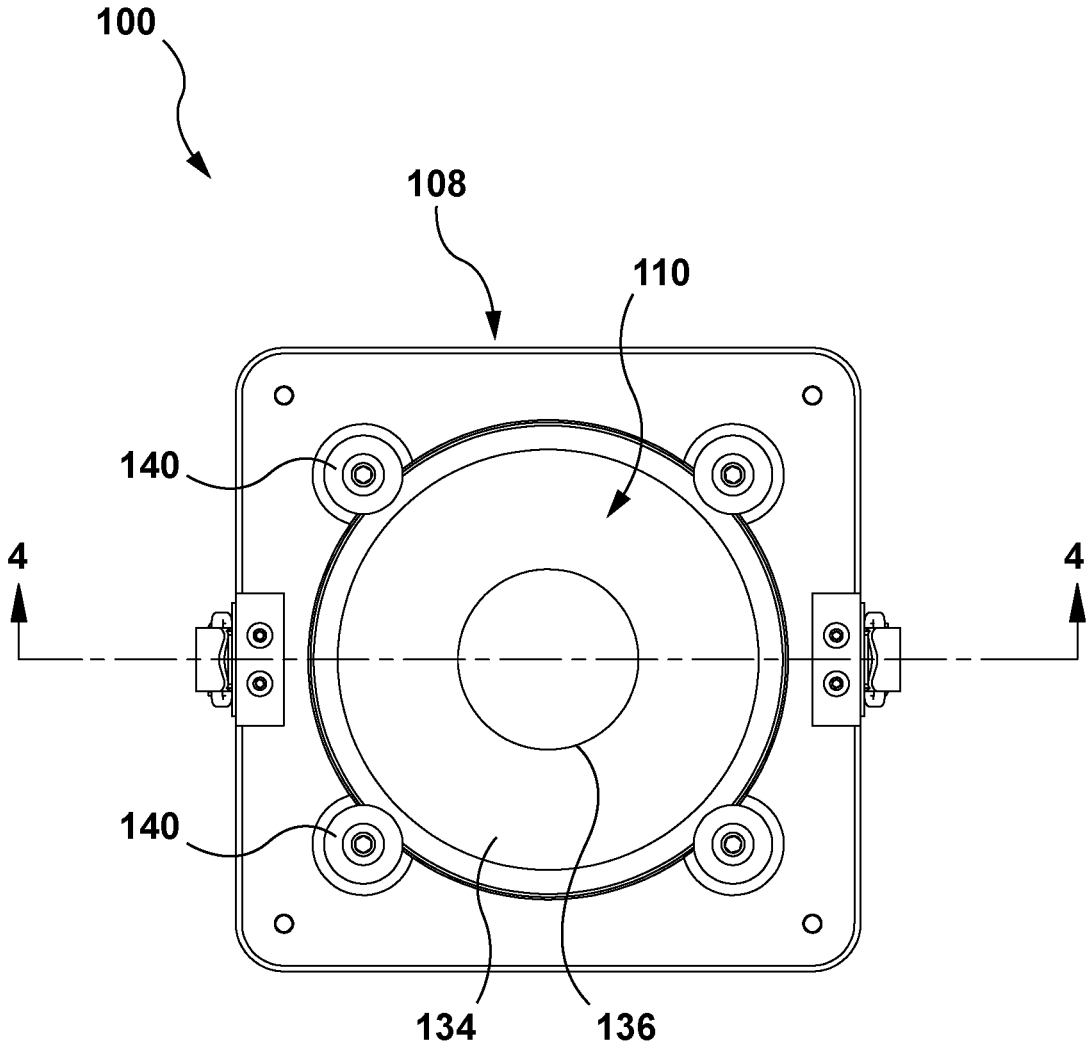
FIG. 3 is a top plan view of the portable detection apparatus of FIG. 1.
Figure 4:
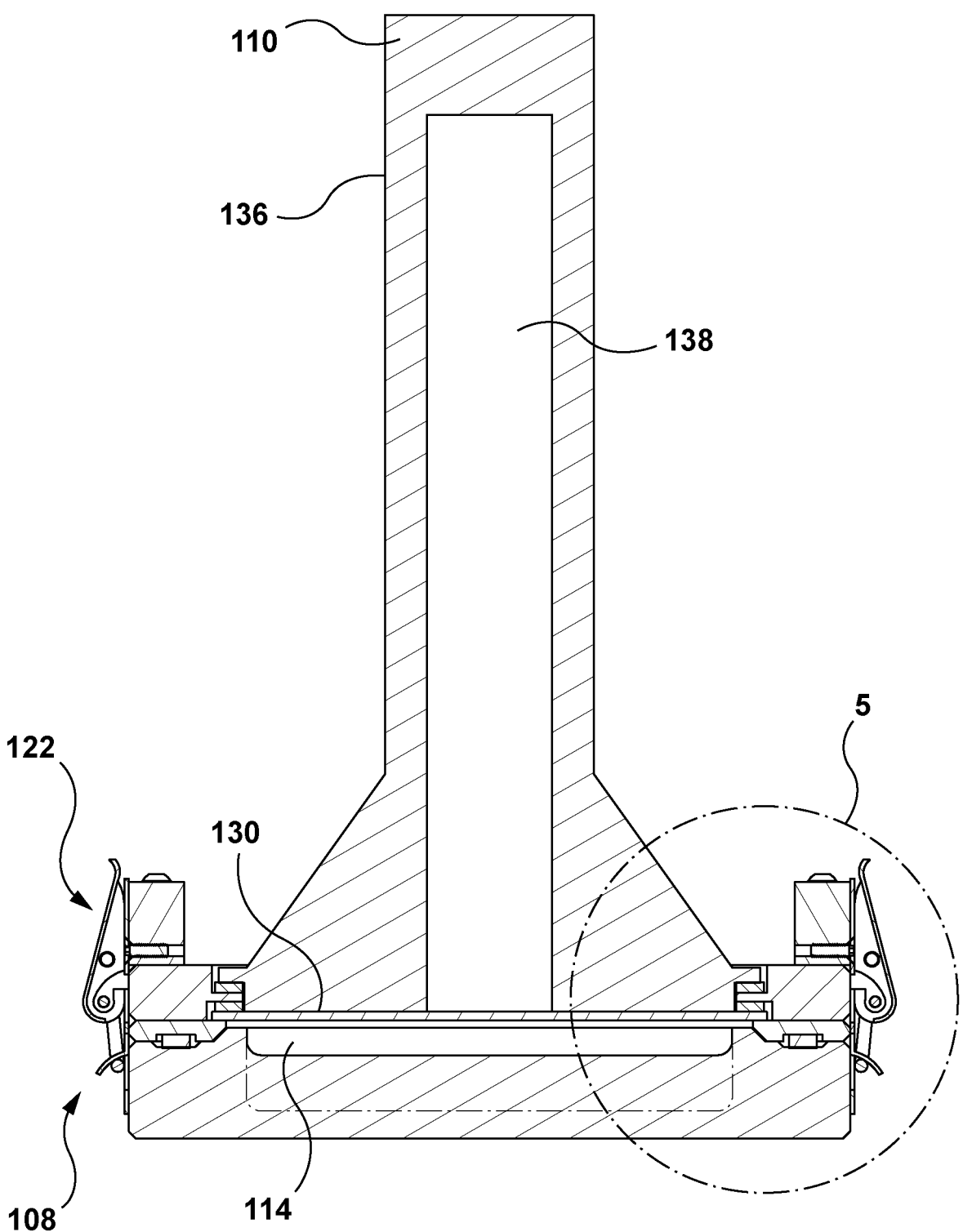
FIG. 4 is cross-sectional view of the portable detection apparatus of FIG. 1, taken along line 4-4.

Referring to FIGS. 1 and 2, in this example, the detector unit 102 includes a detection chamber 108 and a photon detector housing 110 mounted thereto. The detection chamber 108 includes a base 112 having a sample holding region 114 bounded by a sidewall 116 and an upper cover 118. When assembled together as shown in FIG. 1, the base 112 and upper cover 118 co-operate to define an interior 120 (see also FIG. 5) of the detection chamber 108 that is configured to receive a sample to be tested.

Preferably, the base 112 and upper cover 118 at least partially separable or detachable from each other to allow the detection chamber 108 to be opened to insert and/or remove test sample. For example, the base 112 and upper cover 118 and may be connected together using a releasable fastening apparatus, such as the latches 122 illustrated in this example, to allow a user to selectable open and close the detection chamber 108 as desired.

Preferably, when the detection chamber 108 is closed (FIG. 1) external, ambient light is excluded from the interior 120 detection chamber 108. This may help facilitate the measurement of photons emitted by the scintillating slurry (and/or layer of particulate scintillating material as described herein), and reduce the interference from photons from other light sources.

Because this embodiment of the detection apparatus 100 is intended to take measurements on relatively wet soil samples, it may also be desirable to generally, or at least substantially seal the detection chamber 108 when the detection apparatus 100 is in use, for example to help reduce the likelihood of water or scintillating slurry leaking out of the detection chamber 108.

Optionally, to help inhibit ambient light ingress and/or to help seal the detection chamber in a generally liquid-tight manner, the detector unit may include one or more seals and/or sealing assemblies, such as o-rings or gaskets 126 as used in the illustrated example.

Optionally, at least some of the walls/material bounding the detection chamber 108 can be at least partially, and preferably substantially optically transparent. Providing such a transparent wall portion may allow photons to exit the detection chamber 108 without having to open the detection chamber 108, while still inhibiting the leakage of soil or water from within the chamber 108. This may allow a suitable photon detector to be positioned proximate the detection chamber 108 to receive the photons, without exposing the photon detector to the sample. This may help inhibit fouling of the photon detector. Referring to FIG. 2, in the present example the upper cover 118 has a transparent wall portion that is provided by a glass cover 130 that is mounted between carrying members 132, and sealed using appropriate ones of the gaskets 126. In this example, the upper cover 118 is of a multi-piece construction, but in other examples may be of unitary construction.

To take advantage of the visibility provided by the glass cover 130, the photon detector housing 110 is configured to generally match the shape of the glass cover 130 and is registered over the glass cover 130 when assembled. In this example, the photon detector housing 110 includes flared portion 134 configured to mate with the glass cover 130 and support an elongate holding portion 136 that houses a suitable photon detector, such as a photomultiplier tube 138. The photon detector housing 110 can be detachably coupled to the detector unit 102 in any desirable manner, including by using threaded faster assemblies 140 connected to the upper cover 118. When the detection chamber 108 is closed, the photomultiplier tube 138 is positioned to receive photons emitted by material within the interior 114.

Figure 5:
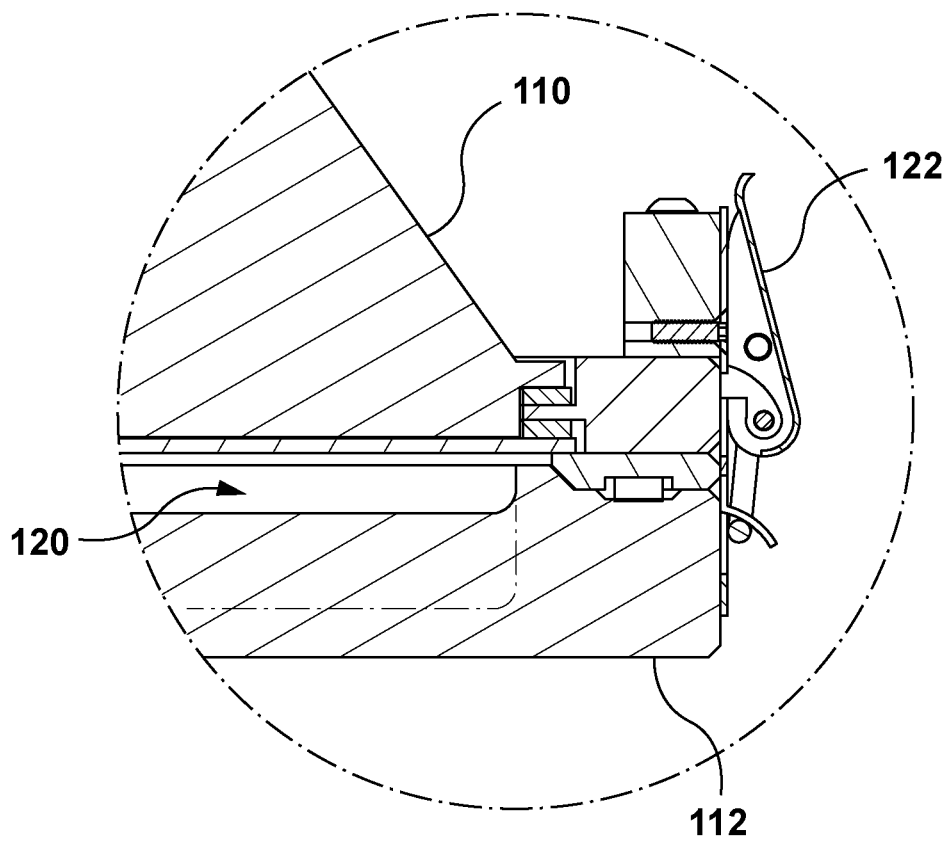
FIG. 5 is an enlarged portion of the cross-sectional view of FIG. 4.

Optionally, a test sample may be placed directly on the base 112. However, this may foul the base 112 and/or contribute to possible cross-contamination between test samples. Alternatively, the sample may be prepared in a suitable sample holder, which may then be positioned within the detection chamber 108 and removed from the detection chamber 108 when the test is complete. Referring to FIG. 5, one example of a sample holder 144 is illustrated schematically, and is shown in a partial cut-away view to reveal a schematic example of a test sample 146. The configuration of this sample holder 144 and sample 146 is exemplary for the purposes of discussion, and other sample holders and samples may have different configurations—preferably to be physically compatible with associated detection chambers. Preferably, the sample holder 144 is configured have a generally open top, so as to not obstruct photons existing the sample, and may be liquid impermeable to help prevent liquids from leaking through the sample holder 144.

In this example, the sample 146 is formed from a combination of soil and is relatively wet. The sample 146 has a body portion 148 and a measurement surface 150. The measurement surface 150 is shown as being a generally planar, upwardly facing surface in this example and is intended to be registered beneath the glass cover 130 and lower end of the photomultiplier tube 138 when the apparatus 100 is in use, so that the glass cover 130 is disposed between the sample and the layer of scintillating slurry and the photon detector when the detection chamber 108 is closed. The measurement surface 150 of the sample 146 may be shaped and/or prepared by a user when loading the sample 146 into the sample holder 144 so as to be substantially planar. However, as apparatus 100 is usable as a portable testing apparatus, the sample 146 may not be as processed/shaped to the same tolerances that a laboratory-analyzed sample would be. In particular, the measurement surface 150 may not be as smooth as would typically be created in a laboratory-analyzed sample and may, as schematically illustrated at an exaggerated scale, be non-uniform and have a surface roughness on a visible/macro scale. This surface roughness may be due at least in part to the non-homogeneous nature of the composition of the soil sample. The overall size or surface area of the measurement surface 150 may be selected based on the configuration of a given apparatus 100, but may be, in some examples, less than about 2 cm$^2$ and preferably is between about 2 cm$^2$ and about 30 cm$^2$ or more. While shown as having a generally disc-like configuration, in which the measurement surface 150 is generally circular, the sample 146 may have any other suitable configuration.

In this example, the sample 146 defines a sample thickness 152 in a direction generally orthogonal to the plane containing the measurement surface 150. The sample thickness 152 may be any suitable thickness that is appropriate for a given apparatus 100, and may be, for example, between about 0.3 cm and about 2 cm or more.

Figure 6:
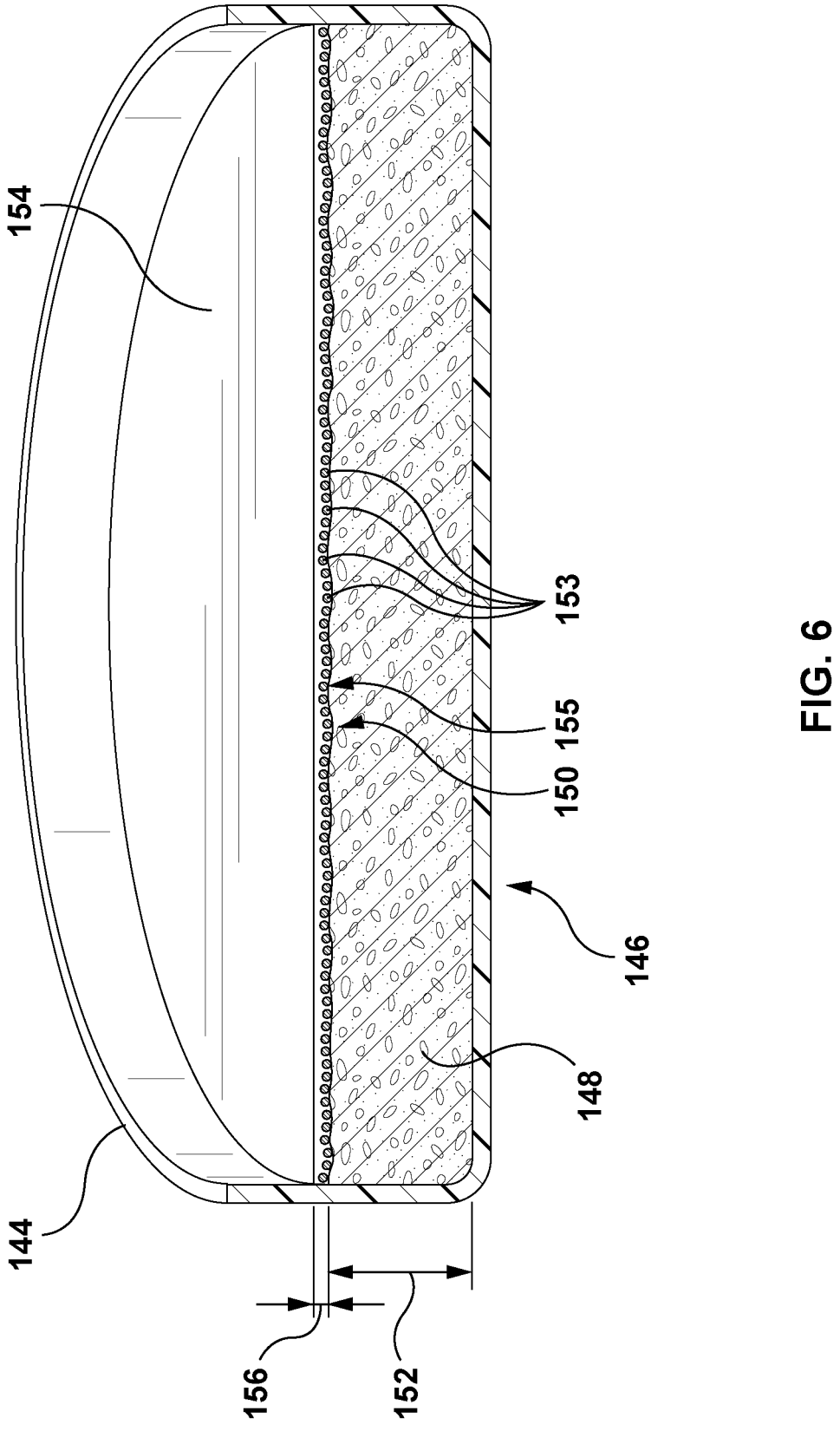
FIG. 6 is schematic representation of a sample holder suitable for use with the portable detection apparatus of FIG. 1.

Referring still to FIG. 6, a schematic representation of a layer of scintillating slurry 154 is shown on top of the measurement surface 150. While shown as covering substantially the entire measurement surface 150 in the present example, the layer of scintillating slurry 154 need not cover the entire measurement surface 150 in all examples, and may cover at least 50%, at least 60%, at least 70%, at least 80% and at least 90% or more of the measurement surface 150 in another example.

A layer of particulate scintillating material 155 is shown covering the measurement surface 150 and is formed from a plurality of scintillating particles 153. In this example, the layer of particulate scintillating material 155 is located at the interface between the measurement surface 150 and the layer of water 154 and covers substantially the entire measurement surface with a generally uniform thickness. In this example, the layer of particulate scintillating material 155 is entirely submerged within the layer of water 154, while in other examples at least some of the particles 153 may only be partially submerged, and/or some portions of the measurement surface may not be covered by the layer of water 154 at all.

The thickness 156 of the layer of scintillating slurry 154 can be selected so as to provide a sufficient amount of the scintillating slurry so as to produce a useful quantity of photons to be measured. Too thin a layer 155 of scintillating slurry 154 may not contain enough scintillating material to produce as useful quantity of photons. If the layer 155 of scintillating slurry 154 is too thick then the lower portions of the slurry itself may attenuate the alpha particles emitted from the sample media such that they do not reach the scintillating material located in the upper portions of the slurry layer 155, while upper portions of the slurry itself may block at least some of the photons that are emitted by scintillating material disposed in the lower portions of the slurry thereby inhibiting its overall photon output. In some examples, a desirable thickness 156 for the layer of scintillating slurry 154 may be between about 3 µm and about 20 µm.

When assembled for use, an upper side of the layer of scintillating slurry 154 may be spaced from the lower end of the photomultiplier 138 by a gap that may be between about 1 mm and about 100 mm.

When the apparatus 100 is in use, photos emitted by the layer of scintillating slurry 154 can be detected by the photomultiplier tube 138 and electrical output signals from the photomultiplier tube 138 are conveyed to the control unit 104. The control unit 104 preferably includes a suitable controller 160 to receive and analyze the output signals. This analysis may be done in any suitable manner, including, for example comparing a magnitude of the output signals to a predetermined threshold level, and generating a positive output if the detected magnitude exceeds the threshold (i.e. radiation is present) and generating a negative output if the detected magnitude does not exceed the threshold value. The controller 160 may include any suitable amplifier 164 (either internal or as an external component) and/or processor and memory 166 modules.

The control unit 104 also preferably includes a user display device 162 that can provide information to a user, preferably based on the outputs generated by the controller. The display device may be a screen, light, audio transducer or the like.

When the measurements on a given sample 146 are complete the sample 146 itself along with the layer of slurry 154 thereon can be removed from the detection chamber 108. In the present example, this has the effect of removing all scintillating material from the apparatus 100. The sample 146 and layer of scintillating slurry 154 can then be disposed of. A second sample could then be prepared, by applying a fresh layer of scintillating slurry to its measurement surface and positioned within the detection chamber 108 for measurement.

In some examples, both the solid and liquid components of the sample 146—i.e. the soil and the water—may be contaminated with alpha emitting material. In other examples, only the solid components of the sample 146 may be contaminated and the water component may be relatively and/or substantially free of alpha particles.

Referring to FIG. 7, one exemplary method 700 of detecting alpha particles in a sample comprising soil and water using a suitable a portable detection apparatus (such as that shown in FIGS. 1-6) is illustrated. A step 710, a user can provide a layer of scintillating slurry 156 onto a measurement surface 150 of a suitable sample 146. The sample 146 may optionally be provided in a sample holder 144 at this step.

The sample 146 along with its layer of layer of scintillating slurry 156 can then be inserted into a suitable detection chamber 108 (step 720) for a suitable detection time period. The detection time period may differ for different examples of the methods and apparatuses described herein, but may, in some examples, be between about 2 and about 25 minutes. In some examples the detection period may be less than 2 minutes. In some examples the detection period may be longer than 25 minutes. Preferably, because the apparatus 100 can be used as a portable detection apparatus the detection period is less than about 25 minutes so that one or more detection periods can be completed in a single day, or part of a day, by a user who is on-site at a target location.

During the detection period the detection apparatus 100 can be used to detect photons that are produced by the granular scintillating material in the scintillating slurry 154 when the granular scintillating material is excited by ionizing alpha radiation emitted by alpha particles within the sample (step 730). This is preferably done using a photon detector that can generate a corresponding output signal (step 740). The output signals can be routed to the control unit 104 for processing.

When the measurement is complete, the combination of the sample 146 and its scintillating slurry layer 154/155 are removed, preferably, from the detection chamber 108 (step 750) and may optionally be disposed of disposal.

To form the slurry that is used in step 710, a user may form the slurry by i) combining the granular scintillating material with an appropriate amount of water or other liquid and then applying the pre-mixed slurry onto the measurement surface, or ii) depositing dry, granular scintillating material onto a measurement surface that is wet with liquid contained in the sample itself and forming the slurry in situ on the measurement surface by combining the granular scintillating material with the existing liquid/water (either passively and/or assisted by mixing, shaking or the like), or iii) other possible methods.

For example, the granular scintillating material may be mixed with an appropriate amount of water in a separate mixing container and then spread on the measurement surface. Alternatively, for example if the sample does not include a desired amount of available water, the granular scintillating material may be deposited on the measurement surface a user may then apply a mist of water (or other suitable deposition technique) onto the measurement surface thereby forming the scintillating slurry in situ on the measurement surface. If sufficient water is present in the sample itself then a user may deposit a dry powder comprising the granular scintillating material onto the measurement surface to be combined with the native water present in the sample, thereby forming the scintillating slurry in situ on the measurement surface.

The method 700 may then be repeated for other samples as desired, preferably using a common detection apparatus 100.

Some embodiments of the teachings described herein were tested as described in the following examples, which are illustrative and not limiting of any particular embodiment or embodiments of the teachings described herein. will now be illustrated with reference to the following examples, which should not be used to construe or limit the scope of the present invention.

Example 1—Experiments Using Known Source of Alpha Radiation

The purpose of these experiments was to examine the capability of silver-activated zinc sulphide (ZnS[Ag]) powder and of yttrium aluminum perovskite crystal doped with cerium (YAP[Ce]) to detect alpha particles both in the absence and presence of water.

Experimental Set-Up

Figure 8:
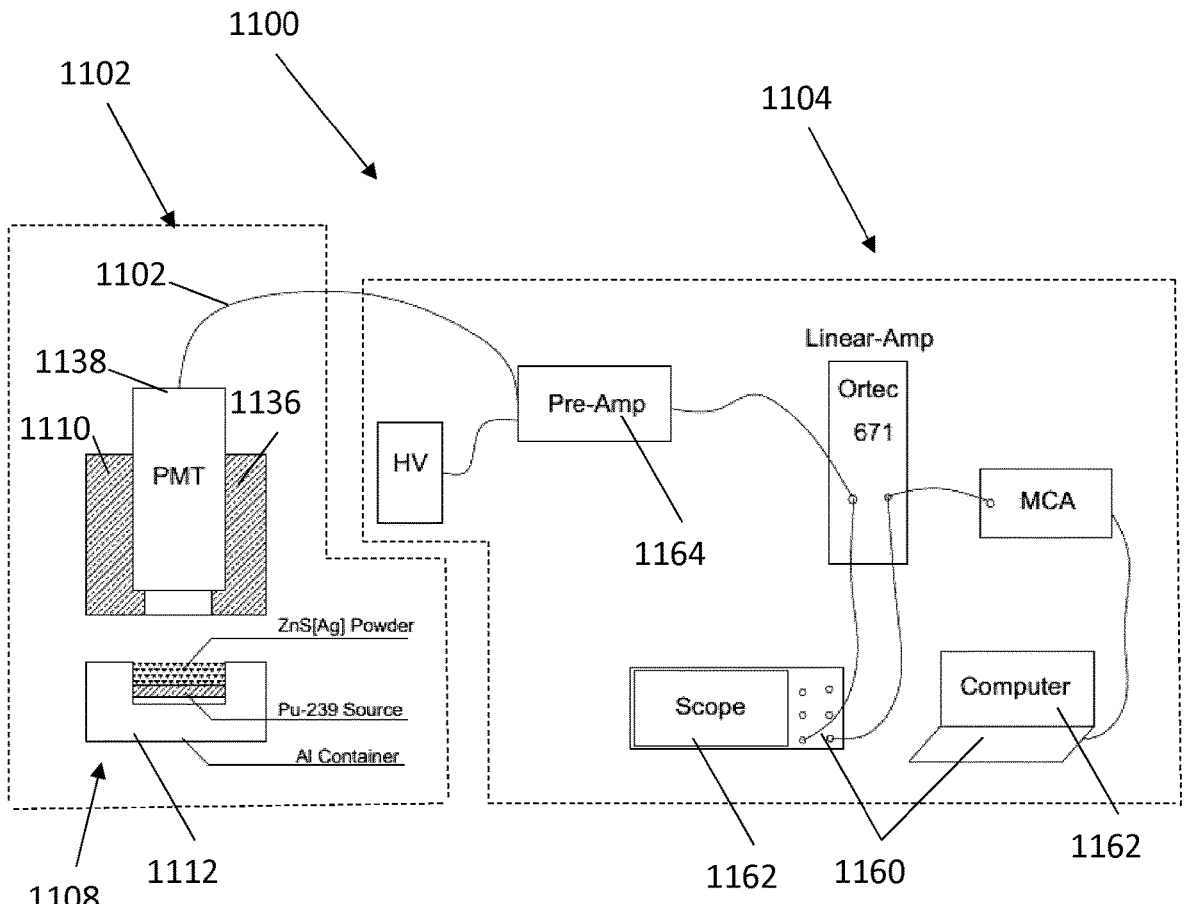
FIG. 8 is a schematic representation of another example of a detection apparatus.

A schematic of the experimental configuration of a detection apparatus 1100 is illustrated in FIG. 8. The detection apparatus 1100 is analogous to the detection apparatus 100, with like features indicated using like reference numbers indexed by 1000. For example, the detection apparatus 1100 includes a detector unit 1102 having a base 1112, detector housing 1110, detection chamber 1108 and a photomultiplier tube 1138 with a holding portion 1136.

In this example, a disk of Plutonium-239 (Pu-239) was used as the test sample or "source disk". Pu-239 is a known source of alpha radiation. The source disk was a Pu-239 film deposited on a metal disk. The activity of the source disk was 200 Bq. A layer of scintillating material was provide on the disk.

In this set-up the light emitted from the scintillating material was collected with a Hamamatsu PMT assembly (photomultiplier tube 1138), R6427, which has a 33.0 mm diameter. The light pulses were converted to electrical pulses through the PMT 1138 and fed to an amplifier apparatus 1164 that includes a pre-amplifier, Ortec 142B and a linear amplifier Ortec 617. The pulses were integrated in the pre-amplifier, from which the output signal was fed into the linear amplifier, Ortec 671. The pulses were shaped and amplified in the linear amplifier. A controller 1160 including a multiple channel analyzer (MCA), Amp-Tek C8000, a computer, with a display device and a scope 1162, was used to read the output pulses from the linear amplifier and generate the spectrum. The computer was used to log the data from the MCA. All the spectra data collected in this experiment were from the MCA with 180 seconds counting.

To help prevent ambient light from interfering with the light generated in the scintillator, the PMT 1138 and scintillator assembly were enclosed in a light-tight black box (which can function as the detection chamber). Two layers of black cloth covered the top of the box to further reduce the ambient light. An oscilloscope was used to monitor the pulses from the pre-amplifier and the linear-amplifier. The linear-amplifier and the high voltage module were used within a nuclear instrument module (NIM).

The MCA input range was from 0 to 10 volts. As a result, the PMT high voltage and the linear amplifier gain were tuned so that the pulse height of the linear amplifier fell into this range.

The primary setup in this example was as follows:

| | |
|---|---|
| PMT high voltage supply | −700 volts |
| Linear amplifier coarse gain | 10 |
| Linear amplifier fine gain | 1.0 |
| Linear amplifier pulse shaping time | 1.0 us |
| MCA input range | 10 volts |

The PMT 1138 was enclosed in an aluminum casing. The Pu-239 source disk was placed in the bottom of the sample container/detection chamber 1108 in the base 1112, and ZnS[Ag] powder was distributed on top of the Pu-239 source disk. The base 1112 was then filled with water, resulting in the ZnS[Ag] scintillator powder being converted into a slurry and being distributed across the Pu-239 source (a proxy for the sample 146).

Figure 9A:
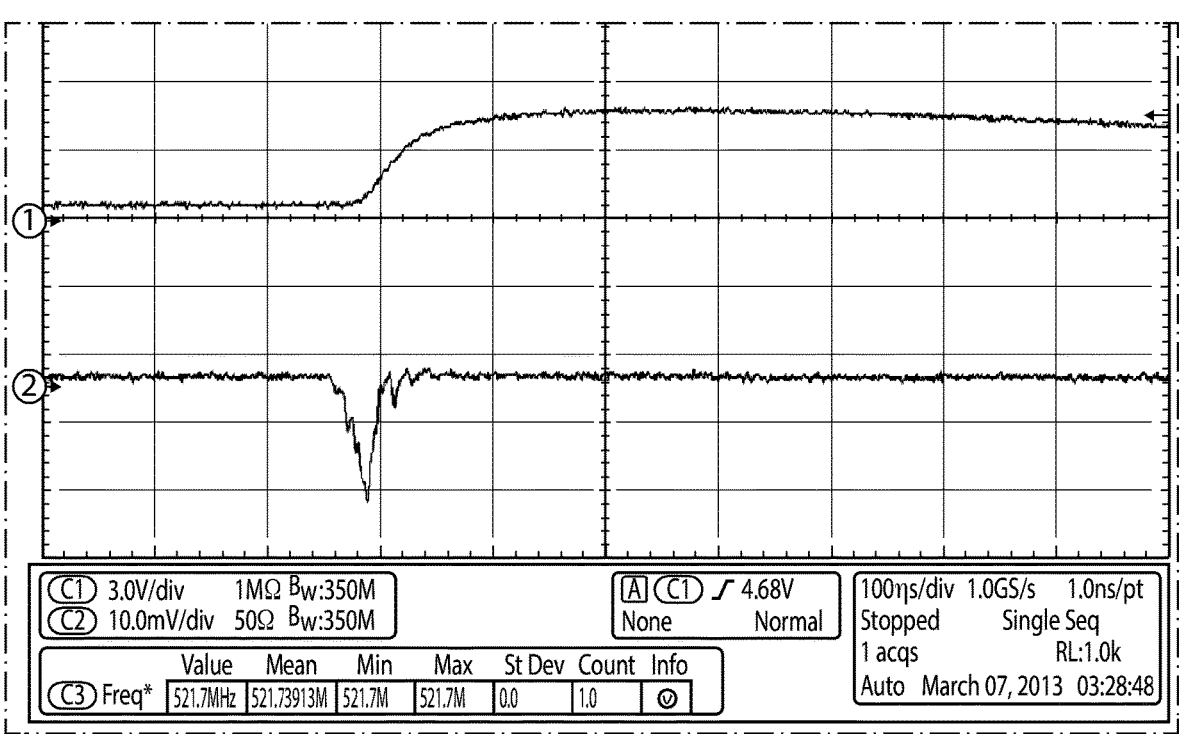
FIGS. 9*a* and 9*b* are screen captures from the oscilloscope used in the exemplary apparatus of FIG. 8.
Figure 9B:
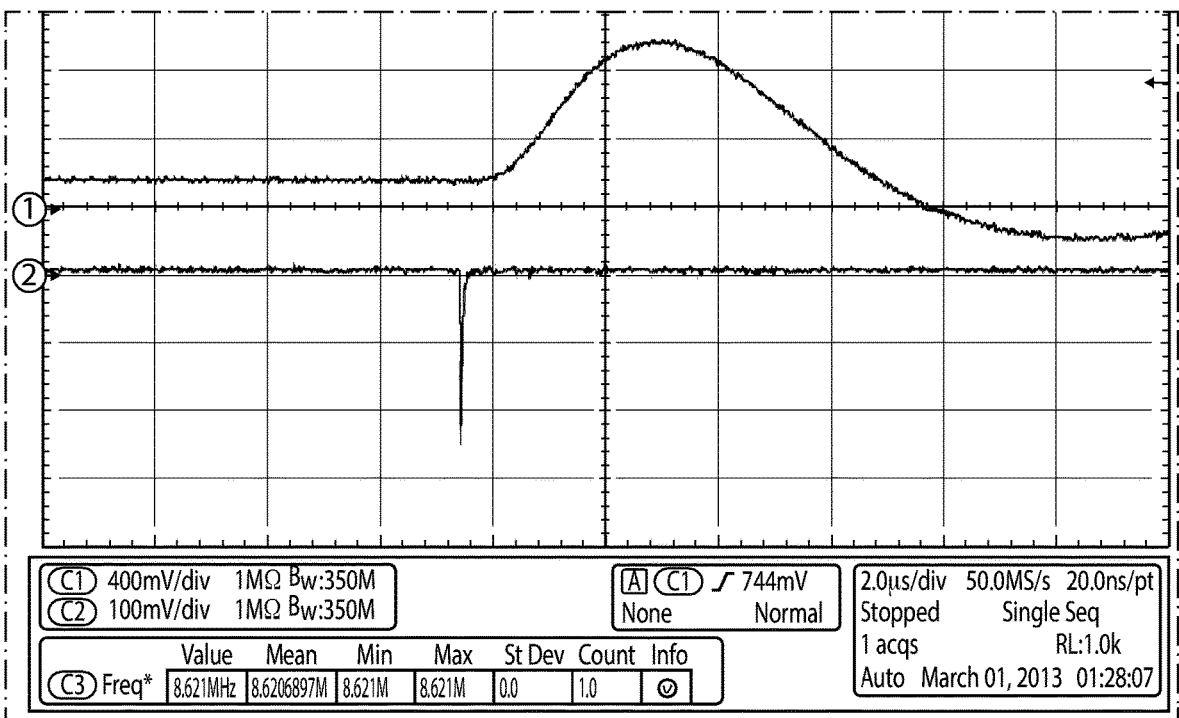

With the pulse counting system tuned, the pulse signal from the pre-amplifier and the linear-amplifier was captured from the oscilloscope. Examples of screen captures from the oscilloscope, taken when the ZnS[Ag] powder was applied on top of the Pu-239 source disk, are shown in FIGS. 9*a* (pre-amp output 1 and PMT output 2) and 9*b* (linear-amp output 1 and PMT output 2). The preamplifier output was the integral of the PMT output, but with a discharge time constant of a few microseconds. The linear-amplifier shaped the pulses from the pre-amplifier output and kept the pulse heights constant.

Results

A. Testing for Background

Figure 10:
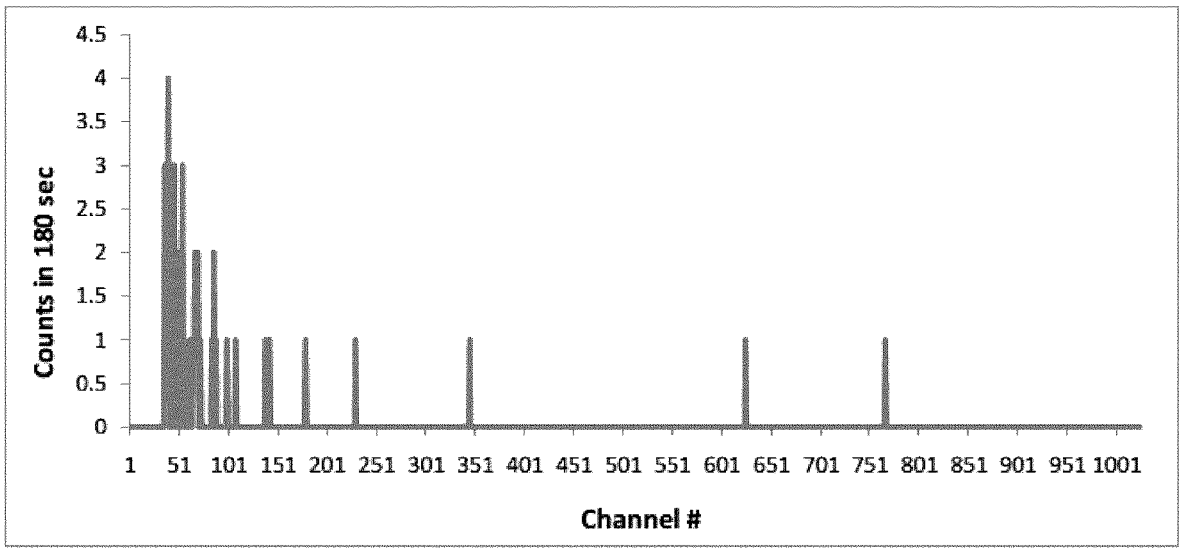
FIG. 10 is a plot showing pulse height spectrum vs channel on the MCA used in the exemplary apparatus of FIG. 8 with no radiation source and no scintillator material present.

Before taking any spectrum with the Pu-239 source disk, a background check was carried out. Without a source disk or any scintillator in the container, the PMT 1138 was used to measure ambient air. The pulse height spectrum is shown in FIG. 10. As seen in FIG. 10, the background spectrum showed minimal counts, suggesting that the ambient light and/or any other light source did not affect the measurement system.

Figure 11:
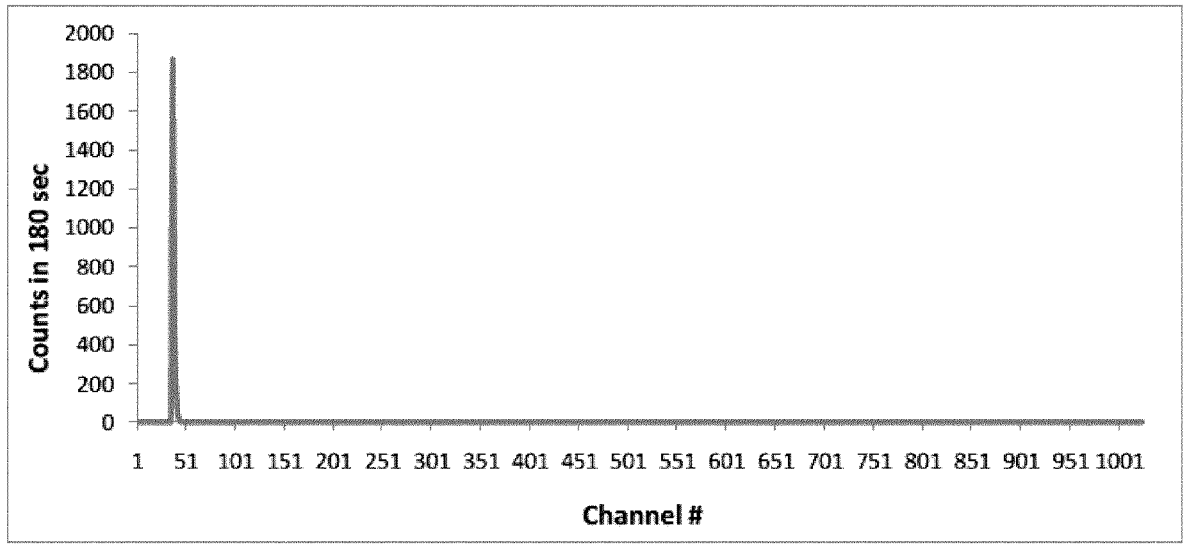
FIG. 11 is another plot showing pulse height spectrum vs channel on the MCA used in the exemplary apparatus of FIG. 8 with a radiation source but no scintillator material present.

Next, the activity of the Pu-239 source disk on its own was determined (i.e., no scintillator). The pulse height spectrum of the Pu-239 source disk is shown in FIG. 11. As seen in FIG. 11, the Pu-239 source disk generated a substantial level of low energy counts, but very little at higher energies. While not wishing to be bound by any particular theory or mode of action, this observed effect may be the result of the alpha particles emitted by the Pu-239 source disk interacting with the container or the glass window of the PMT, thereby generating photons. Overall, it was observed that the background spectrum did not appear to affect the measurement in the high energy range.

B. Experimental Results—YAP[Ce] Scintillator

Figure 12A:
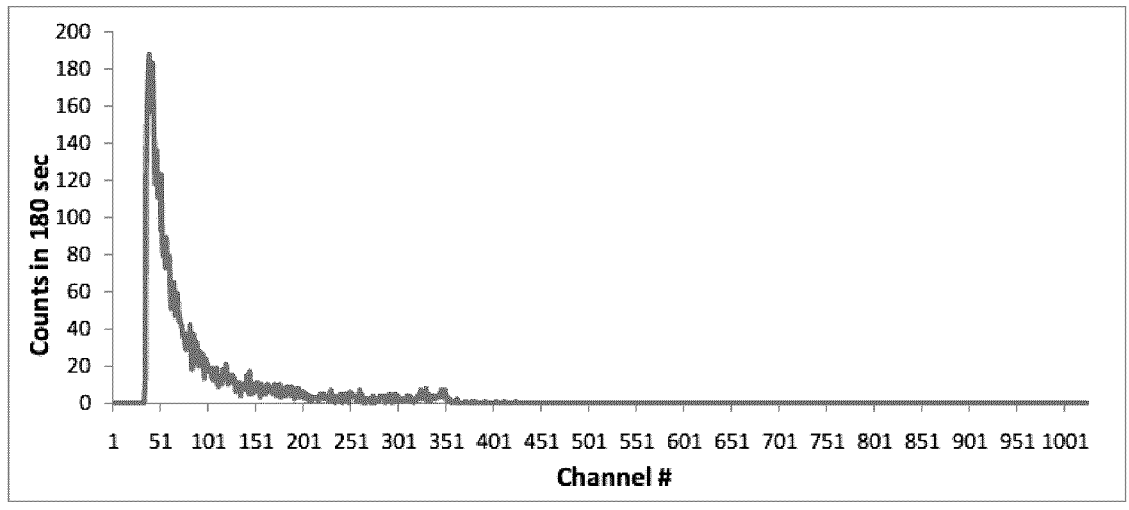
FIG. 12*a* is another plot showing pulse height spectrum vs channel on the MCA used in the exemplary apparatus of FIG. 8 with no radiation source but with a scintillator material present.
Figure 12B:
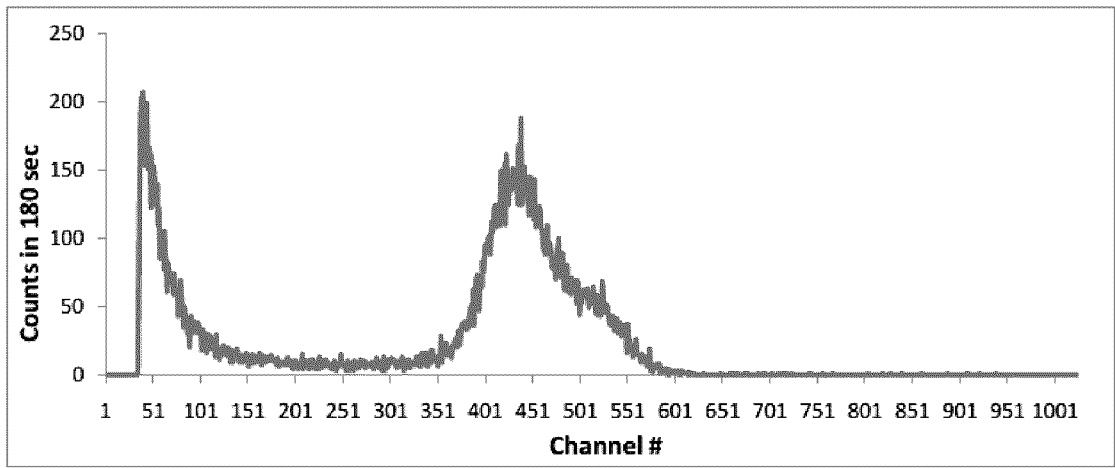
FIG. 12*b* another plot showing pulse height spectrum vs channel on the MCA used in the exemplary apparatus of FIG. 8 with a radiation source and a scintillator material present.

The YAP[Ce] scintillator used was a cylindrical crystal. FIG. 12 illustrates the background spectra activity of (a) the YAP[Ce] scintillator when measured on its own (i.e., no Pu-239 source disk) and (b) when the YAP[Ce] scintillator was placed on top of the Pu-239 source disk.

As seen in FIG. 12(*a*), when only the YAP[Ce] scintillator was measured, the counts were similar to the background noise, with most of the counts being located at fairly low energies.

When the YAP[Ce] scintillator was placed on top of the Pu-239 source disk (FIG. 12(*b*)), there was a peak between channel 350 and channel 600, which was likely caused by the alpha source. The total number of counts in this region was 15419 over a period of 180 seconds, which equals 86 counts/s. While the Pu-239 source disk had an activity of 200 Bq, this measurement takes into account emissions from both sides of the source disk. However, it is likely that only emissions from one side of the source disk can reach the crystal and therefore, with 100% efficiency, the count rate should be 100 counts per second. Here, the counting efficiency of the YAP[Ce] scintillator was about 86% (i.e., 86/100).

Due to the form-factor of the YAP[Ce] crystal, sufficient contact between the crystal surface and soil particles was challenging. Also, the YAP[Ce] crystal was larger in volume, so it appeared to be also sensitive to gamma, which made the separation of alpha particles and gamma photons difficult. Therefore, the focus of the remaining experiments was on the ZnS[Ag] powder scintillator.

C. Experimental Results—ZnS[Ag] Scintillator

Figure 13A:
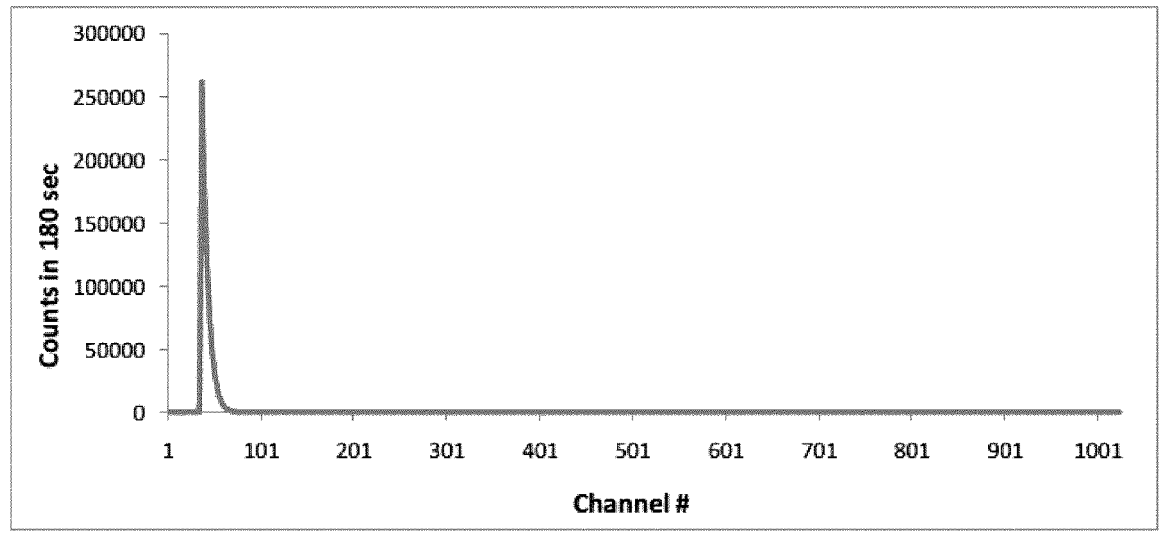
FIG. 13*a* is another plot showing pulse height spectrum vs channel on the MCA used in the exemplary apparatus of FIG. 8 with a dry scintillator material present.
Figure 13B:
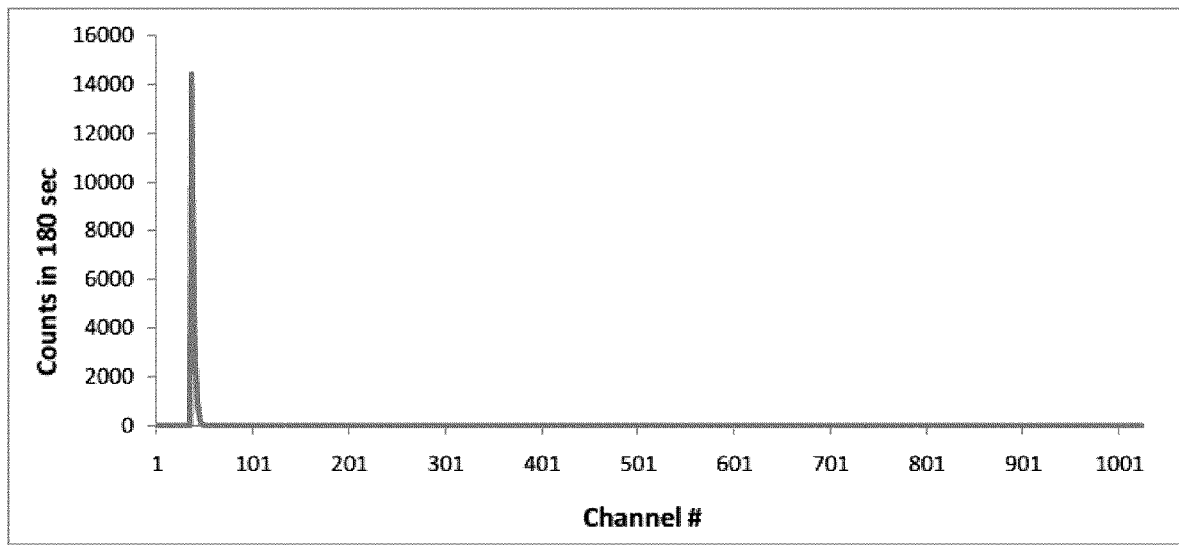
FIG. 13*b* another plot showing pulse height spectrum vs channel on the MCA used in the exemplary apparatus of FIG. 8 with a wet scintillator material present.
Figure 14A:
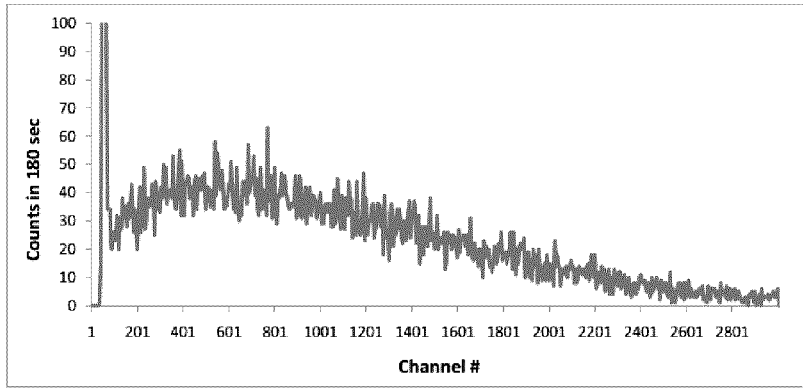
FIGS. 14*a*-14*d* are plots showing pulse height spectrum for very thin, thin, thick and very thick layers of a wet scintillating slurry on a Pu-239 radiation source.
Figure 14B:
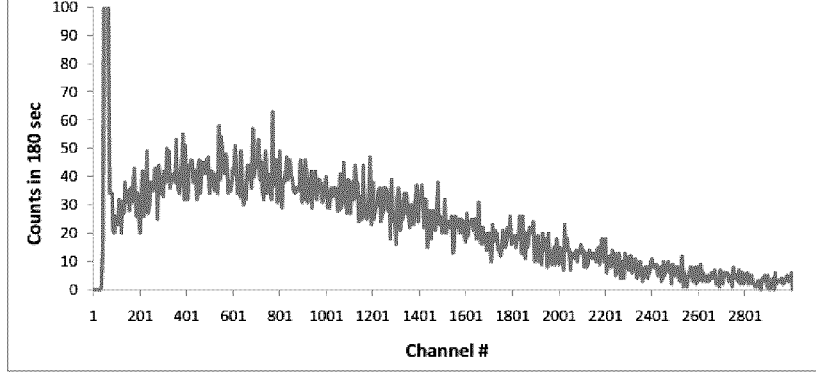
Figure 14C:
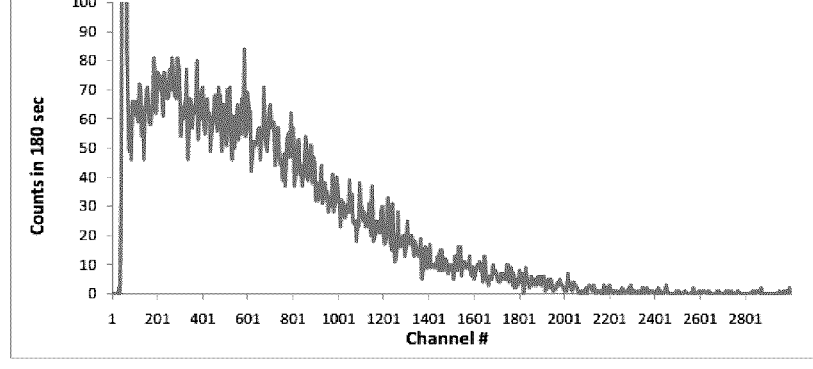
Figure 14D:
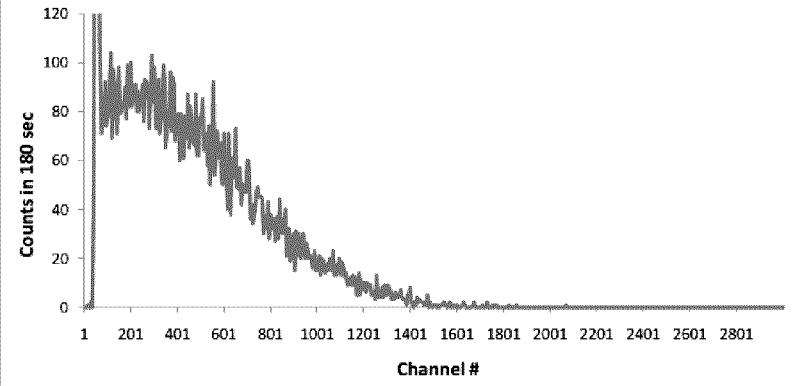

FIG. 13 illustrates the background spectra activity of (a) dry ZnS[Ag] powder and (b) wet ZnS[Ag] powder when measured on its own (i.e., no Pu-239 source disk). As seen in FIG. 13, the total number of counts was large, but with the peak at low energies.

ZnS[Ag] powder is sensitive to alpha, beta, and X-rays. While not wishing to be bound by any particular theory or mode of action, the results set out in FIG. 13 may be due to the ambient air containing radioactive particles, such as radon, which may be formed as an intermediate step in the normal radioactive decay chains of thorium and uranium. These particles may have interacted with the ZnS[Ag] powder to generate background photons.

Next, the ZnS[Ag] scintillator was used to measure the activity of the Pu-239 source disk. Various thicknesses of ZnS[Ag] powder were tested. The ZnS[Ag] powder was mixed with water before it was applied on top of the Pu-239 source disk. As a result, a layer of water always existed on top of the Pu-239 source disk.

ZnS[Ag] can emit light when interacting with alpha particles, but it also can absorb some of the light it emits. If the layer of ZnS[Ag] powder used is too thin, there may not be enough powder to cover the entire surface of the Pu-239 source disk. However, if the ZnS[Ag] powder is too thick, some of the light may be self-absorbed. Therefore, various thicknesses of ZnS[Ag] powder were tested, as described below.

The ZnS[Ag] powder was mixed with water to form a slurry and the slurry was sprayed onto the Pu-239 source disk. In this example, about 2 grams of powder was mixed with about 100 grams of water.

With the first spray, a very thin layer of the ZnS[Ag] powder slurry was deposited on the Pu-239 source disk (referred to as "Very Thin" case, herein). The layer of slurry was somewhat transparent and the color of the Pu-239 source disk was still discernible. After the second spray, the slurry layer fully covered the surface of the Pu-239 disk (referred to as "Thin" case herein). The case after third spray is referred to as "Thick" and the case after fourth spray is referred to as "Very Thick", herein.

The spectra of each case is illustrated in FIGS. 14a-14d. The spectrum did not change significantly as the powder thickness was increased from Very Thin to Thin. However, as the power layer got thicker, the main peak shifted to lower energy. While not wishing to be bound by any particular theory or mode of action, this observed effect may be the result of the thicker ZnS[Ag] powder absorbing more light, resulting in less photons reaching the PMT.

Figure 15:
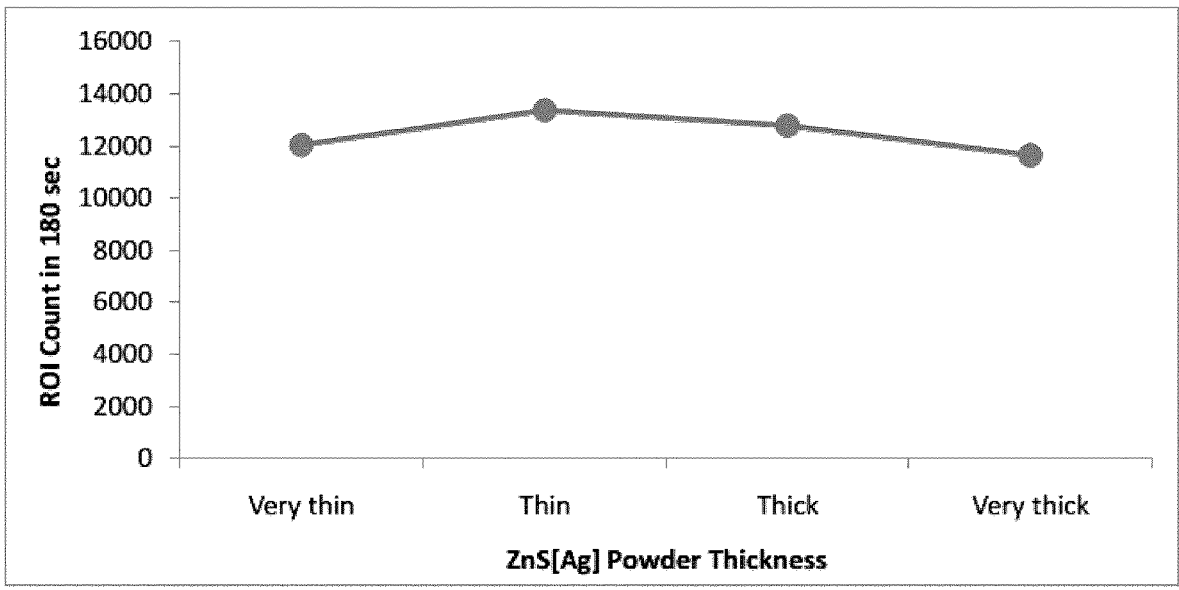
FIG. 15 is a plot showing the ROI counts for the spectrums in FIGS. 14*a*-14*d;*

The background spectrum stopped at channel #106. The region of interest (ROI) was defined from 106 to the maximum channel #. The count numbers in ROI are listed in Table 1 below, and plotted in FIG. 15. The counts increased slightly from Very Thin to Thin, and then started to decrease from Thin to Thick, and Thick to Very Thick. However, the change was within 15% of the maximum counts.

TABLE 1

| ROI counts vs. ZnS[Ag] powder thickness | | | | |
|---|---|---|---|---|
| Powder Thickness | Very thin | Thin | Thick | Very thick |
| ROI counts | 12017 | 13346 | 12765 | 11628 |

The maximum count rate of the ZnS[Ag] was 13346 counts in 180 seconds, or 74 counts per second. Thus, the counting efficiency of the powder was 74% (i.e., 74/100)

Example 2—Experiments Using Contaminated Soil

Other experiments were conducted to investigate the capability of silver-activated zinc sulphide (ZnS[Ag]) powder to detect radiation contamination in soil samples.

A soil sample was obtained and analyzed by direct gamma spectrum and the spectrum from the chemical extraction of the soil. It was found that 1 gram of the dry soil had 100 Bq of gross alpha, 1100 Bq of gross beta, 105 Bq of Co-60 gamma, and 102 Bq of Cs-137 gamma.

The experiment configuration was similar to that described above with Pu-239, with the two main differences:

i. a larger size container was used (the smaller containers described herein had diameter of about 2 inches, while the larger containers had a diameter of about 5 inches); and ii. to account for the soil being black, which may have caused it to absorb some of the emitted light, the PMT high voltage was adjusted to −1000 volts from −700 volts to obtain higher gain.

Figure 16:
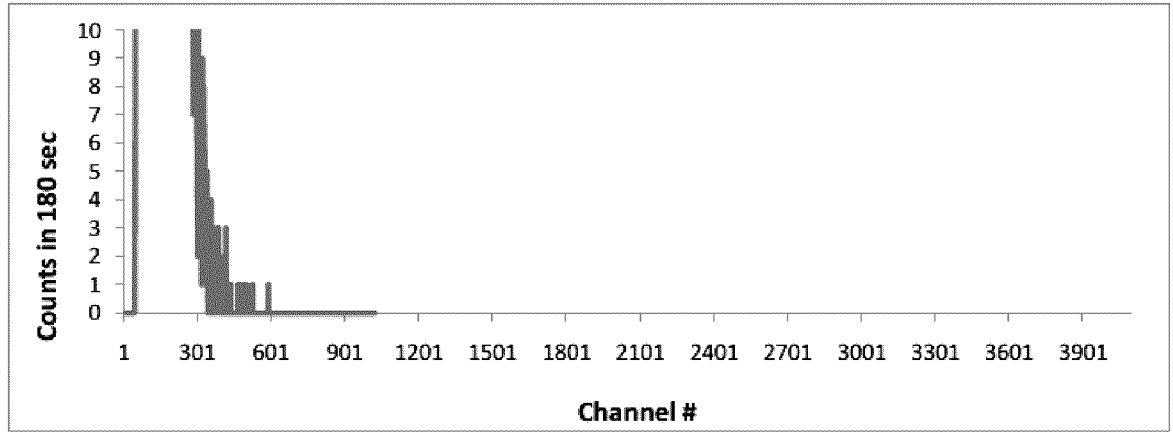
FIG. 16 is a plot showing the pulse height spectrum from a thick wet scintillating slurry without soil.

First, the background spectrum of wet ZnS[Ag] powder was measured (i.e., without soil). FIG. 16 illustrates the background spectrum of Thick wet ZnS[Ag] powder. As seen in FIG. 16, the background stopped at channel #600. Therefore, the ROI in the spectra was defined as Channel #600 to maximum channel #.

Figure 17A:
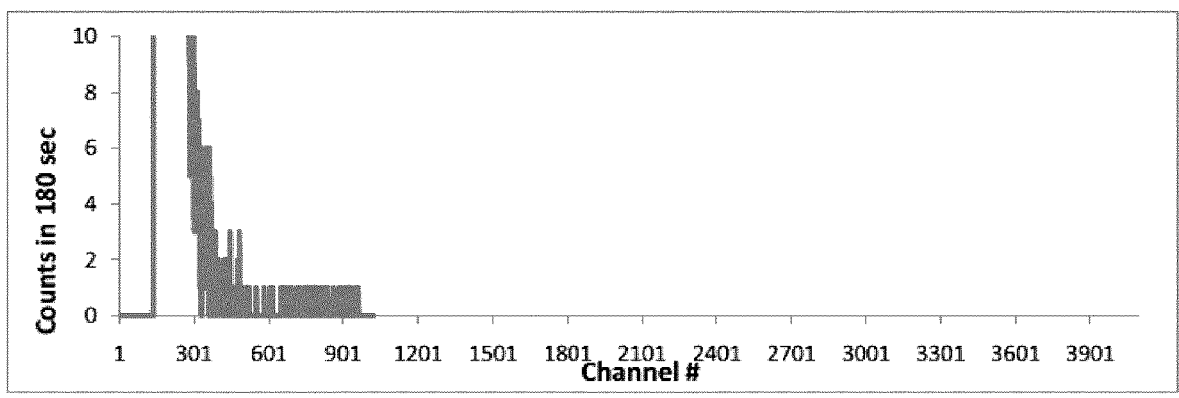
FIGS. 17*a*-17*c* are plots showing the pulse height spectrum from a soil sample mixed with a scintillating material 2, 14 and 25 minutes after mixing.
Figure 17B:
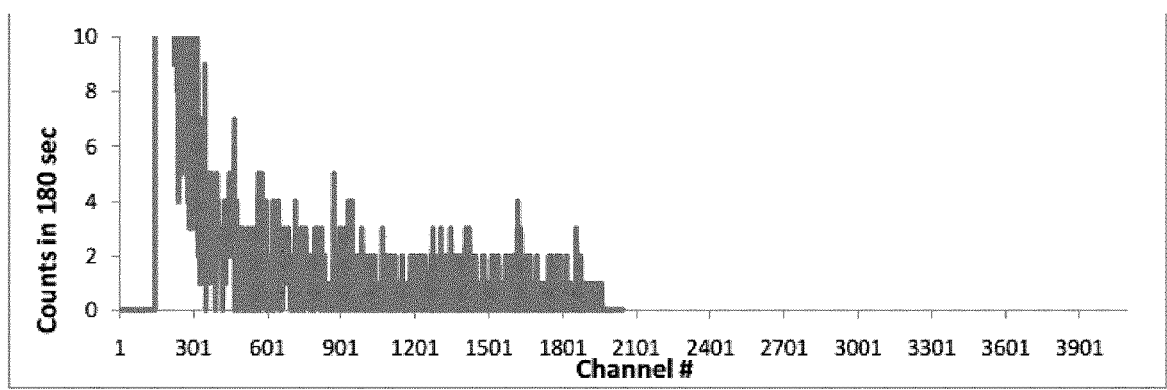
Figure 17C:
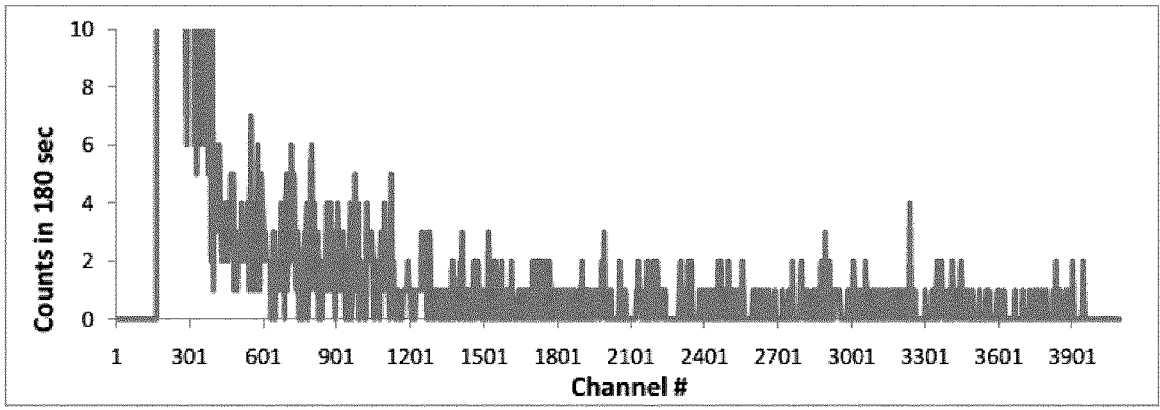
Figure 18:
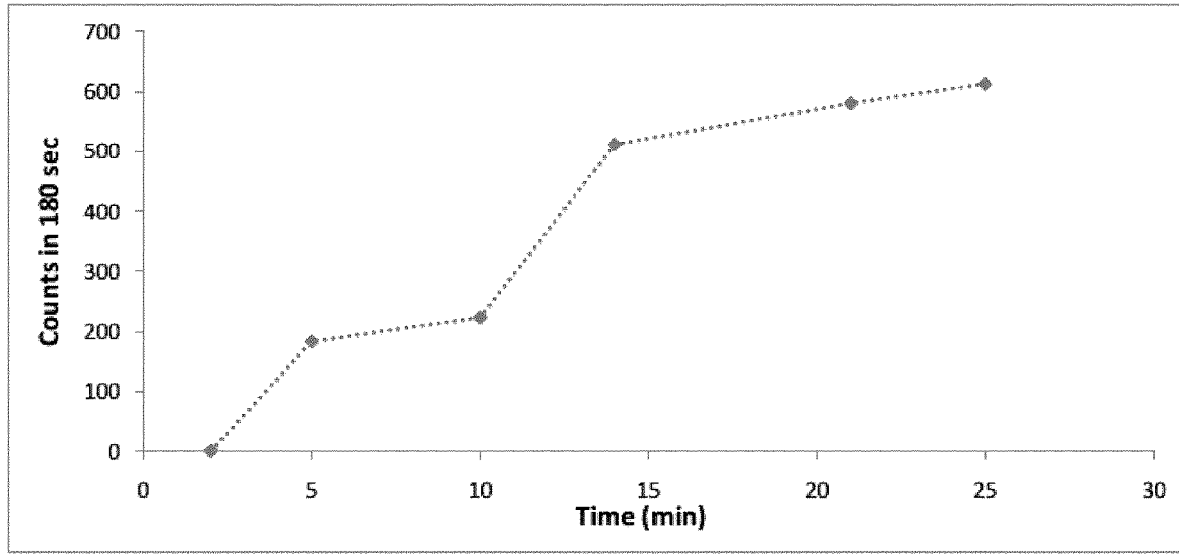
FIG. 18 is a plot of ROI counts taken for a spectrum from a soil sample mixed with a scintillating material 2, 5, 10, 14, 21 and 25 minutes after mixing.

Next, the soil sample was sprayed with a slurry containing a mixture of water and ZnS[Ag] powder. It took approximately two (2) minutes for the powder to deposit to the bottom of the water. Six spectra measurements were then taken: at 2, 5, 10, 14, 21, and 25 minutes after the soil sample was mixed with the ZnS[Ag] powder slurry. FIGS. 17a-17c illustrate the spectra taken at (a) 2 minutes, (b) 14 minutes, and (c) 25 minutes. The counts in the ROIs of the six spectra are listed in Table 2 below, and plotted in FIG. 18.

TABLE 2

| ROI counts vs. Time | | | | | |
|---|---|---|---|---|---|
| Time (min) | 2 | 5 | 10 | 14 | 21 | 25 |
| ROI counts | 0 | 183 | 223 | 511 | 580 | 612 |

As seen in Table 2 and FIGS. 17a-17c and 18, the spectrum changed with time. In particular, more pulses were observed with time, as compared to the background spectrum and the distribution of these pulses appeared to extend to higher energies with time. Due to the increased pulses of higher energy, the gain of the linear amplifier was lowered from 10×1.0 (coarse gain 10, and fine gain 1.0) to 5×1.0, and lowered down to 5×0.2 at the end. To facilitate comparison of the spectra, the channel numbers were extended at lower linear-amp gain to ensure the same channel #represented the same energy in each spectrum.

As above, the soil sample used in the experiment contained alpha, beta and gamma radiation, each of which could generate the scintillation pulses. While not wishing to be bound by any particular theory or mode of action, it is thought to be unlikely that the observed signal pulses were caused by the gamma photons for at least the reasons that follow.

First, compared to alpha and beta particles, the gamma photons may have penetrated the water more easily, whereas both alpha and beta particles may only travel a limited distance in water. Alpha particles can travel about 37 μm in water with 5 MeV energy, which is approximately the alpha decay energy of Am-241. Beta particles can travel, in the range of 174 μm for 0.5 MeV beta particles, which is the beta decay energy of Strontium-90.

In addition, considering the small amount of the ZnS[Ag] powder, the sensitivity of ZnS[Ag] to gamma photons may be expected to be extremely low as the relatively thin layers of ZnS[Ag] has an almost negligible probability to capture gamma photons.

Furthermore, if the signal pulses were generated by gamma photons, the time-dependent effect may not be expected to happen. While not wishing to be bound by any particular theory or mode of action, the observation of the time-dependent effect may be that the ZnS[Ag] particles take time to get close enough to the soil particle surface for the alpha or beta particles to reach them. In time, more and more ZnS[Ag] particles reach the effective range of the alpha or beta particles, so the energy received from the alpha or beta particle may increase with time.

Example 3—Experiments Testing an Alpha Detector

Additional experiments were conducted to test an alpha detector apparatus that uses ZnS[Ag] powder scintillator with a known alpha source, alpha-contaminated soil, beta-contaminated soil, and clean soil.

Experimental Set-Up

Figure 19:
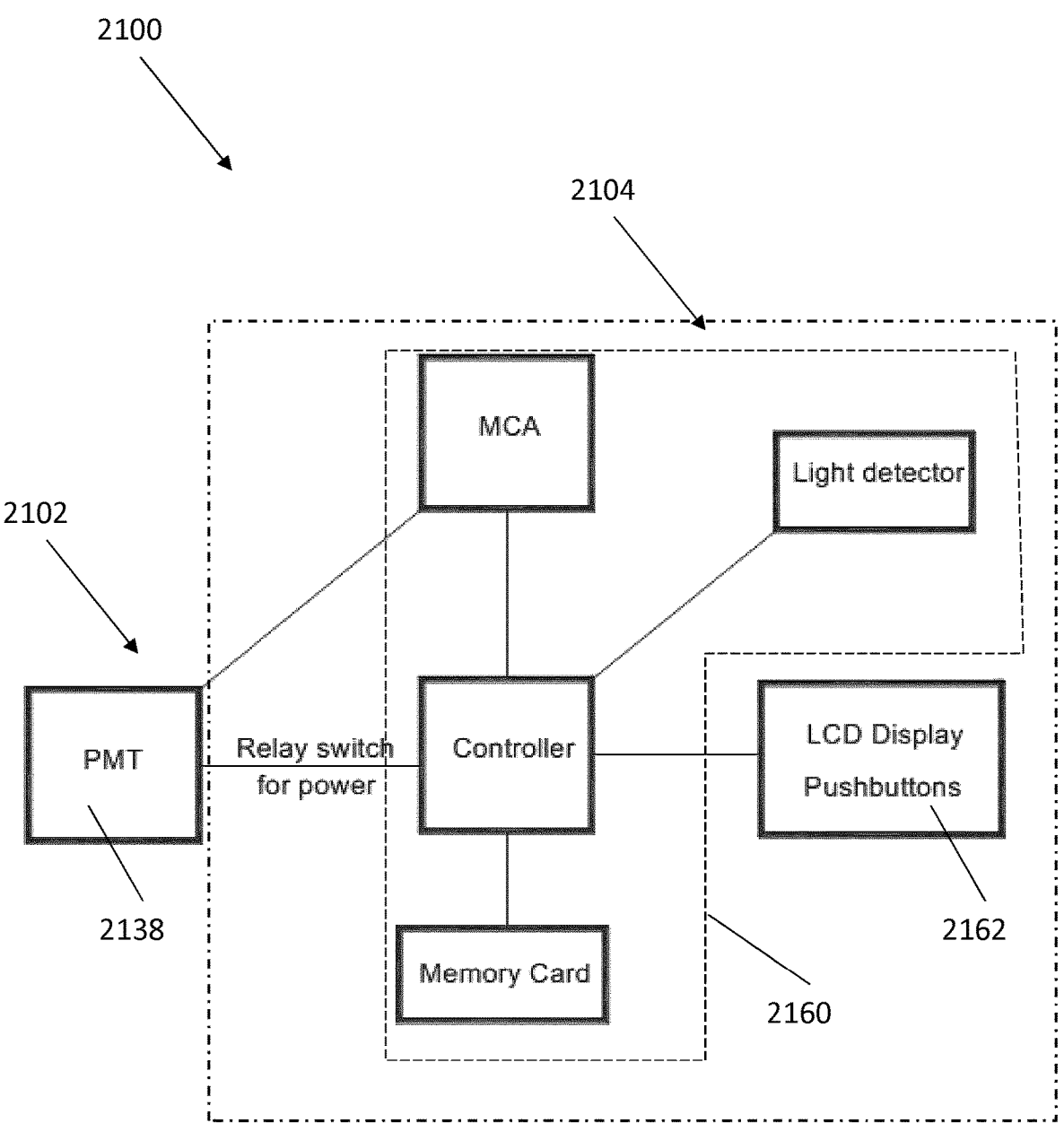
FIG. 19 is a schematic representation of one experimental radiation detection apparatus.

A schematic example of some aspects of this example of a detection apparatus 2100 is shown in FIG. 19. Apparatus 2100 is analogous to apparatus 100, and like features are identified using like reference characters indexed by 2000. In this experimental set-up the detection chamber (not illustrated) included a soil holder that was light-tight and had a drawer that held the soil sample. When the apparatus was in use the soil sample was registered directly beneath a PMT 2138. With ZnS[Ag] powder applied to the top measurement surface of the contaminated soil sample, the scintillation photons would emanate up towards the PMT 2138 and generate electrical pulses. These pulses were registered and counted by an MCA (part of controller 2160). The count rate, with a unit of counts per minute (cpm), was displayed on the a user display device 2162 that included an LCD display.

In this example, the apparatus 2100 includes a detection unit 2102 and a control unit 2104 with a controller 2160 including the MCA, a microcontroller, a memory card, and a light detector, the PMT 2138 and a display device 2162, which can also accept inputs in some examples and can be referred to generally as a Human Machine Interface (HMI). A suitable power supply was also provided. A microcontroller module, including an Arduino Mega 2560, is used to control the MCA, power supply module, LCD display, and pushbuttons. The power for all components came from a 7.4 V lithium ion battery. A DC-DC converter produced 12 VDC to provide the power for the high voltage module as needed.

PMT and Soil Sample Holder Assembly

The detection chamber in this example included a receptacle for holding the soil sample, a drawer, and PMT mount. A 1.0 inch cavity, in the centre of the drawer, held the soil sample. With the drawer closed, the soil sample was registered below the PMT 2138, preferably on centre. The PMT 2138 slid and secured into the mount, which was a cylindrical sleeve that featured a split-clamp section at the top.

The assembly was made of black Acetal and was light-tight when closed. Being light-tight was a requirement for the operation of the PMT 2138. A switch was mounted at the back end of the receptacle that had to be triggered (by the drawer) to provide power to the high voltage module. When opened, the PMT 2138 did not receive power which may have provided protection from damage due to high input light.

Multiple Channel Analyzer

A Multiple Channel Analyzer (MCA) is a laboratory instrument that may be used to analyze the pulse energy spectrum (or charge spectrum) of a pulse train. The MCA used in this example of the apparatus 2100 was an Amptek DP5G, which is a high performance, low power digital pulse processor designed for use in scintillation spectroscopy systems. In comparison to a conventional nuclear spectroscopy system, the Amptek DP5G features a charge sensitive preamplifier in its front end and thus does not need a shaping amplifier. The MCA was connected to the anode of the PMT 2138.

While counting, the energy spectrum as stored in the DP5G, and was sent to the controller 2160 as required. Counting time of the DP5G is configured by the controller through the Universal asynchronous receiver/transmitter (UART) port on board.

Power Supply Module of the Detector

The system electronics in this experimental set-up required power at different supply voltages. The MCA module required 5 V; the Arduino microcontroller requires 7.4 V and the PMT 2138 required a high voltage of between 500-1200 V. The power supply module provided the voltages for all the electronic components and also featured a relay on-board to turn off the high voltage supply to the PMT 2138 when the soil sample was not being counted.

LCD & Pushbutton Module

The LCD module (Olimex Arduino shield: SHIELD-LCD-16×2) had a 16×2 LCD and four pushbuttons. The LCD displayed the system configuration, counting status, and counting results. The pushbuttons were used by the operator to set the counting time and to start and stop counting.

System Controller

The controller interfaced with the MCA, LCD and the power supply module. The controller was a single board computer (Arduino Mega 2560) with a SD card shield (Adafruit Data Logging shield for Arduino).

The controller communicated with the MCA through an Universal Asynchronous Receiver/Transmitter (UART) port, to route commands that initiate counting, cease counting and retrieve the measured spectrum. While the spectrum data was stored in the Secure Digital (SD) card for later analysis, the LCD displayed the total count in real time.

The controller monitored the status of the four push buttons, and the counting time could be configured using these push buttons.

Detector Interlock

An interlock existed to protect the PMT from operating when it is exposed to high environment light. A switch was mounted at the base of the cavity in the soil holder receptacle, and was wired electrically in series with the high voltage module. With the drawer opened, the switch as open and the high voltage did not power the PMT. Only with the drawer closed, could the PMT be supplied with high voltage power.

PMT Voltage Testing

Figure 20:
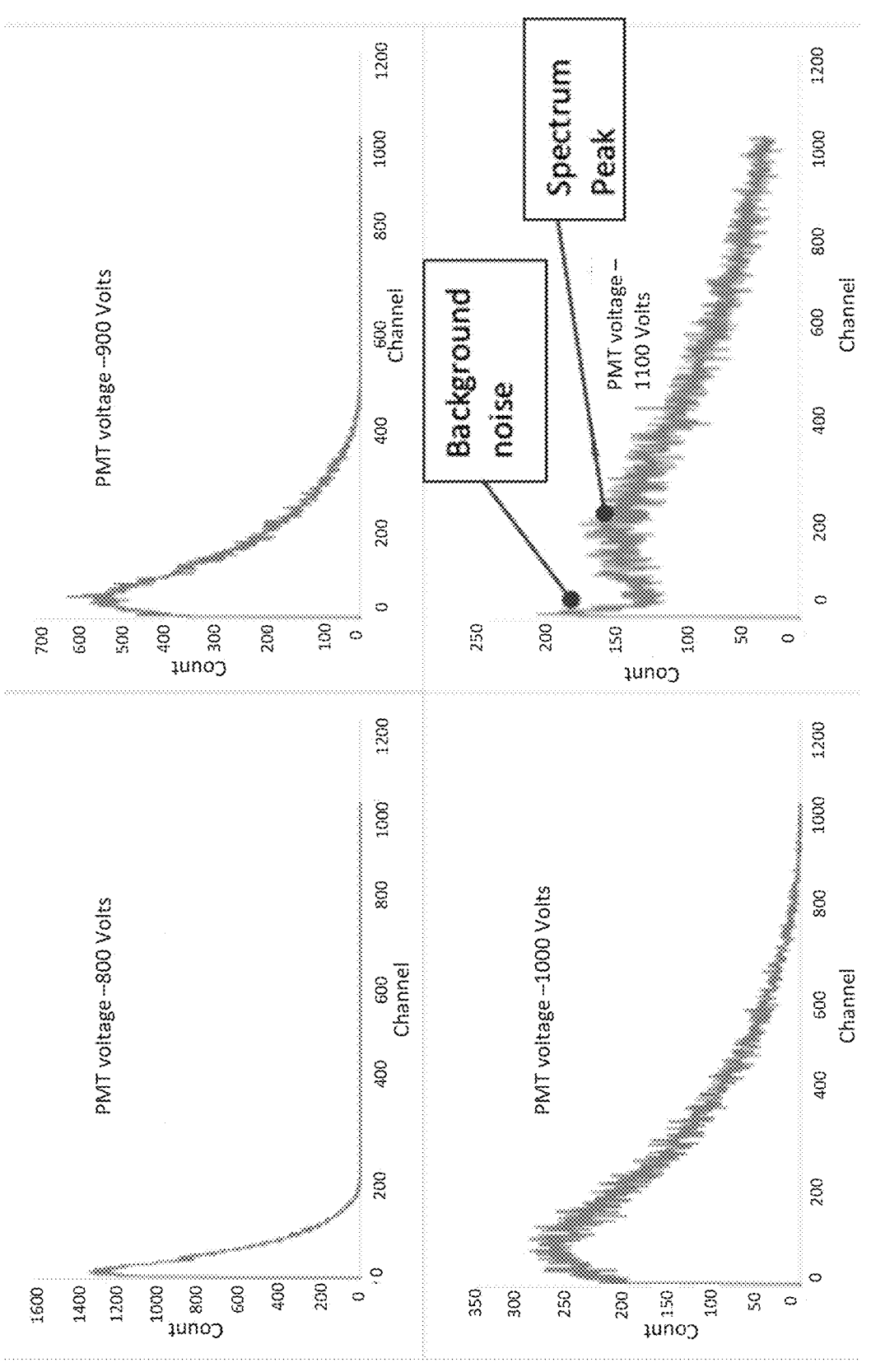
FIG. 20 includes plots showing the measured spectrum with a 0.9 uCi Am-241 alpha source at incrementally higher supply voltages within the supply range.

The voltage supplied to the PMT can affect the threshold channel of the MCA. FIG. 20 shows the measured spectrum with a 0.9 uCi Am-241 alpha source at incrementally higher supply voltages within the supply range. A larger spread in the measured spectrum can result from higher input voltage. When the voltage was set at 1100 V, a background noise peak was observed. After comparing the plots, 1000 V was selected as the final PMT voltage.

Results

A. Testing for Background

To test for background, one sample was prepared without soil. As such, only water and ZnS[Ag] powder was placed in the detector. The average background count was 1 CPM.

B. Testing Alpha-Contaminated Soil

An alpha-contaminated dried soil sample was obtained and analyzed. It was found that the sample had a gross alpha activity of approximately 1.5 Bq/g and a gross beta activity of 52 Bq/g.

This sample was then divided into smaller specimens, of about 10 cm$^3$ each and each specimen was mixed with a small amount of water (about 3 cm$^3$) and tested with the alpha detector apparatus with ZnS[Ag] powder as the scintillator using different count times. The results are set out in Table 3, below:

TABLE 3

| Counting Results of Alpha-Contaminated Soil | | |
| --- | --- | --- |
| Sub-Sample Number | Count time (Minutes) | Average counts (Counts/Minute) |
| 1 | 3.5 | 8.9 |
| 2 | 3.0 | 12.1 |
| 3 | 5.0 | 12 |
| 4 | 4.5 | 9.8 |
| 5 | 18.0 | 8.7 |
| Weighted Average | | 9.6 |

It was found that the initial reading at the start of the measurement resulted in very high count numbers (over thousands), which was likely due to the mechanical disturbance of first spraying, then stirring the soil sample. After two minutes, the count number stabilized. It is believed that due to the self-shielding effect, only the alpha on the top surface will contact the scintillation material and be detected.

C. Testing Beta-Contaminated Soil

A beta-contaminated dried soil sample was obtained and analyzed. It was found that the sample had a gross beta activity of 14 Bq/g. This sample was mixed with a small amount of water (about 3 cm³) and tested with the alpha detector apparatus with ZnS[Ag] powder as the scintillator. An average of 1 CPM was measured, matching that of the background count. This suggests that the ZnS[Ag] powder was not sensitive to beta particles.

D. Testing Clean Soil

Two clean soil samples were obtained, mixed with a small amount of water (about 3 cm³) and tested with the alpha detector apparatus with ZnS[Ag] powder as the scintillator. An average of 1 CPM was measured for each, matching that of the background count.

E. Field Test

The alpha detector apparatus with ZnS[Ag] powder as the scintillator was tested in the field, at a site where alpha contamination was suspected. The wet soil samples were taken at a pre-marked target location, where a high gamma radiation reading was observed.

Of the samples measured, one had a measurement of 2 CPM, whereas the remaining samples gave only a background count (i.e., 1 CPM). The sample with 2 CPM was analyzed in a lab, which confirmed only small traces of alpha were in the sample.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents, and patent applications referred to herein are incorporated by reference in their entirety to the same extent as if each individual publication, patent, or patent application was specifically and individually indicated to be incorporated by reference in its entirety.

What is claimed is:

1. A method of detecting alpha particles in a sample comprising a sample media and water using a portable detection apparatus, the method comprising:

a) providing a layer of a scintillating slurry comprising a granular scintillating material in water onto a measurement surface of the sample;

b) positioning the sample having the scintillating slurry within a detection chamber of detection apparatus;

c) detecting photons produced by the granular scintillating material in the scintillating slurry when the granular scintillating material is excited by ionizing alpha radiation emitted by alpha particles within the sample using a photon detector and generating a corresponding output signal;

d) removing the sample and the scintillating slurry from the detection chamber.

2. The method of claim 1, further comprising disposing of the sample and the scintillating slurry after step d).

3. The method of claim 1, wherein the scintillating slurry covers substantially the entire measurement surface of the sample.

4. The method of claim 1, wherein the measurement surface is non-uniform.

5. The method of claim 1, wherein the alpha particles in the sample are present in the sample media in the sample and wherein the water in the sample is substantially free of alpha particles.

6. The method of claim 1, wherein the scintillating slurry is formed prior to step a) by mixing the granular scintillating material with water and the pre-mixed scintillating slurry is applied to the measurement surface in step a).

7. The method of claim 1, wherein the scintillating slurry is formed during step a) by depositing a dry powder comprising the granular scintillating material onto the measurement surface, wherein dry powder comprising the granular scintillating material mixes with at least one of the water present in the sample and a quantity of water applied to the measurement surface thereby forming the scintillating slurry in situ on the measurement surface.

8. The method of claim 7, further comprises depositing the dry powder comprising the granular scintillating material onto the measurement surface and then applying a mist of water onto the measurement surface thereby forming the scintillating slurry in situ on the measurement surface.

9. The method of claim 7, further comprises applying a mist of water onto the measurement surface and then depositing the dry powder comprising the granular scintillating material onto the measurement surface, thereby forming the scintillating slurry in situ on the measurement surface.

10. The method of claim 1, further comprising transporting the detection apparatus to a testing location and obtaining the sample from the ground at the testing location prior to performing step a).

11. The method of claim 1, further comprising depositing the sample in a sample holder prior to step a), wherein the sample holder is insertable into the detection chamber in step b) and removable from the detection chamber in step d).

12. The method of claim 11, wherein the detection chamber configurable in an open configuration in which the sample and layer of scintillating slurry is insertable or removable from the detection chamber and a closed configuration in which external ambient light is excluded from the detection chamber.

13. The method of claim 1, further comprising comparing the output signal to a predetermined output threshold value and, if the output signal exceeds the output threshold value, displaying a user output on a user display device.

14. The method of claim 13, further comprising amplifying the output signal prior to comparing the output signal to the predetermined output threshold value.

15. The method of claim 1, further comprising detecting alpha particles in a second sample comprising the sample media and water using the portable detection apparatus, the method comprising:

e) after completing step d), providing a second layer of the scintillating slurry comprising the granular scintillating material in water onto a measurement surface of the second sample;

f) positioning the second sample having the second layer of the scintillating slurry within the detection chamber of detection apparatus;

g) detecting photons produced by the granular scintillating material in the second layer of the scintillating slurry when the granular scintillating material is excited by ionizing alpha radiation emitted by alpha particles within the second sample using a photon detector and generating a corresponding second output signal;

h) removing the second sample and the second layer of the scintillating slurry from the detection chamber.

* * * * *